US012279654B2

(12) United States Patent
Sayed et al.

(10) Patent No.: US 12,279,654 B2
(45) Date of Patent: Apr. 22, 2025

(54) AEROSOL PROVISION DEVICE

(71) Applicant: NICOVENTURES TRADING LIMITED, London (GB)

(72) Inventors: Ashley John Sayed, London (GB); Luke James Warren, London (GB); Thomas Alexander John Woodman, London (GB)

(73) Assignee: NICOVENTURES TRADING LIMITED, London (GB)

( * ) Notice: Subject to any disclaimer, the term of this patent is extended or adjusted under 35 U.S.C. 154(b) by 475 days.

(21) Appl. No.: 17/593,138

(22) PCT Filed: Mar. 9, 2020

(86) PCT No.: PCT/EP2020/056241
§ 371 (c)(1),
(2) Date: Sep. 10, 2021

(87) PCT Pub. No.: WO2020/182749
PCT Pub. Date: Sep. 17, 2020

(65) Prior Publication Data
US 2022/0125125 A1 Apr. 28, 2022

(30) Foreign Application Priority Data
Mar. 11, 2019 (GB) .................................... 1903248

(51) Int. Cl.
*A24F 40/60* (2020.01)
*A24F 40/465* (2020.01)
(Continued)

(52) U.S. Cl.
CPC ............ *A24F 40/60* (2020.01); *A24F 40/465* (2020.01); *A24F 40/57* (2020.01); *G06F 3/016* (2013.01);
(Continued)

(58) Field of Classification Search
CPC ........ A24F 40/60; A24F 40/465; A24F 40/57; G06F 3/016; G06F 3/16; H05B 1/0244; H05B 6/108
(Continued)

(56) References Cited

U.S. PATENT DOCUMENTS 9,357,803 B2 * 6/2016 Egoyants ............. H05B 1/0291
9,414,629 B2 * 8/2016 Egoyants ............. A24F 40/485
(Continued)

FOREIGN PATENT DOCUMENTS

CN 107249364 A 10/2017
EP 3272382 A1 1/2018
(Continued)

OTHER PUBLICATIONS

International Preliminary Report on Patentability for Application No. PCT/EP2020/056241, mailed on Sep. 23, 2021, 9 pages.
(Continued)

*Primary Examiner* — Harshad C Patel
(74) *Attorney, Agent, or Firm* — Husch Blackwell

(57) ABSTRACT

An aerosol provision device comprises a heater assembly configured to heat aerosol generating material, an indicator assembly, an input interface configured to receive an input for selecting a heating mode from a plurality of heating modes comprising a first mode and a second mode and a controller. The controller is configured to detect the input for selecting the heating mode and, responsive to detecting the input: (i) determine a selected heating mode based on the input, (ii) cause the heater assembly to begin heating the aerosol generating material according to the selected heating mode, and (iii) cause the indicator assembly to indicate that the device is ready for use within a predetermined period of time after causing the heater assembly to begin heating the aerosol generating material.

26 Claims, 15 Drawing Sheets

(51) Int. Cl.
*A24F 40/57* (2020.01)
*G06F 3/01* (2006.01)
*G06F 3/16* (2006.01)
*H05B 1/02* (2006.01)
*H05B 6/10* (2006.01)

(52) U.S. Cl.
CPC ............. *G06F 3/16* (2013.01); *H05B 1/0244* (2013.01); *H05B 6/108* (2013.01)

(58) Field of Classification Search
USPC ......................................................... 131/328
See application file for complete search history.

(56) References Cited

U.S. PATENT DOCUMENTS

| | | | |
|---|---|---|---|
| 9,999,256 B2 * | 6/2018 | Abramov | A24F 40/57 |
| 10,051,893 B2 * | 8/2018 | Hoffman | G06F 1/3296 |
| 11,528,941 B2 * | 12/2022 | Maeder | A24F 40/51 |
| 11,758,949 B2 * | 9/2023 | Bagai | A24F 40/95 320/114 |
| 11,849,757 B2 * | 12/2023 | Zouev | A24F 1/14 |
| 11,856,654 B2 * | 12/2023 | Batista | A24D 1/20 |
| 2005/0268911 A1 * | 12/2005 | Cross | A61M 11/042 128/203.26 |
| 2013/0037041 A1 | 2/2013 | Worm et al. | |
| 2014/0360515 A1 * | 12/2014 | Vasiliev | A24F 40/46 131/329 |
| 2015/0272225 A1 * | 10/2015 | Worm | A24F 40/42 |
| 2016/0338412 A1 * | 11/2016 | Monsees | H05B 3/146 |
| 2017/0119053 A1 | 5/2017 | Henry et al. | |
| 2021/0052829 A1 | 2/2021 | Dignum et al. | |

FOREIGN PATENT DOCUMENTS

| | | |
|---|---|---|
| JP | 2009502136 A | 1/2009 |
| JP | 2014500017 A | 1/2014 |
| JP | 2014524313 A | 9/2014 |
| JP | 2014525237 A | 9/2014 |
| JP | 2015532158 A | 11/2015 |
| KR | 20170106454 A | 9/2017 |
| KR | 20180070440 A | 6/2018 |
| WO | 2013025921 A1 | 2/2013 |
| WO | 2015046420 A1 | 4/2015 |
| WO | WO-2016090426 A1 | 6/2016 |
| WO | 2016135959 A1 | 9/2016 |
| WO | 2016175320 A1 | 11/2016 |
| WO | 2016188967 A1 | 12/2016 |
| WO | 2017205692 A1 | 11/2017 |
| WO | 2017207674 A1 | 12/2017 |
| WO | 2018087719 A1 | 5/2018 |
| WO | 2018146453 A1 | 8/2018 |
| WO | 2018202651 A1 | 11/2018 |
| WO | 2018206940 A1 | 11/2018 |
| WO | WO-2018206616 A1 | 11/2018 |
| WO | 2019030366 A1 | 2/2019 |
| WO | 2019031877 A2 | 2/2019 |
| WO | 2019200194 A1 | 10/2019 |

OTHER PUBLICATIONS

International Search Report and Written Opinion for International Application No. PCT/EP2020/056241 mailed on Jun. 24, 2020, 16 pages.
"Examination Report No. 1 for Australian Patent Application No. 2020235041, mailed on Aug. 18, 2022", 3 pages.
"International Preliminary Report on Patentability received for PCT Patent Application No. PCT/EP2020/056239, mailed on Sep. 23, 2021", 7 Pages.
"International Search Report and Written Opinion received for PCT Patent Application No. PCT/EP2020/056239, mailed on May 20, 2020", 9 Pages.
"Office Action received for Chinese Patent Application No. 202080034768.4, mailed on Jun. 26, 2023", 9 pages (Official Copy Only).
"Office Action received for Korean Patent Application No. 10-2021-7029236, mailed on Oct. 6, 2023", 9 pages (4 pages of English Translation and 5 pages of Official Copy).
"Office Action received for Russian Patent Application No. 2021126500, mailed on Jun. 2, 2022", 20 pages (12 pages of English Translation and 8 pages of Official Copy).
"Reason for Refusal received for Japanese Patent Application No. 2021-554596, mailed on Jan. 4, 2023", 10 pages (5 pages of English Translation and 5 pages of Official Copy).
NZ Examination Report 1 in NZ Appln. No. 779472, dated Jul. 5, 2023, 3 pages.
NZ Examination Report 2 in NZ Appln. No. 779472, dated Dec. 18, 2023, 2 pages.
Response to NZ Examination Report 1 i NZ Appln. No. 779472, dated Dec. 12, 2023, 107 pages.

* cited by examiner

AEROSOL PROVISION DEVICE

PRIORITY CLAIM

The present application is a National Phase entry of PCT Application No. PCT/EP2020/056241, filed Mar. 9, 2020, which claims priority from Great Britain Application No. 1903248.1, filed Mar. 11, 2019, each of which is hereby fully incorporated herein by reference.

TECHNICAL FIELD

The present invention relates to aerosol provision devices and methods of operating aerosol provision devices.

BACKGROUND

Smoking articles such as cigarettes, cigars, and the like burn tobacco during use to create tobacco smoke. Attempts have been made to provide alternatives to these articles that burn tobacco by creating products that release compounds without burning. Examples of such products are heating devices which release compounds by heating, but not burning, the material. The material may be for example tobacco or other non-tobacco products, which may or may not contain nicotine.

SUMMARY

According to a first aspect of the present disclosure, there is provided an aerosol provision device, comprising:
a heater assembly configured to heat aerosol generating material;
an indicator assembly;
an input interface configured to receive an input for selecting a heating mode from a plurality of heating modes comprising a first mode and a second mode; and
  a controller, configured to:
  detect the input for selecting the heating mode; and
  responsive to detecting the input:
    determine a selected heating mode based on the input;
    cause the heater assembly to begin heating the aerosol generating material according to the selected heating mode; and
    cause the indicator assembly to indicate that the device is ready for use within a predetermined period of time after causing the heater assembly to begin heating the aerosol generating material.

According to a second aspect of the present disclosure, there is provided a method of operating an aerosol provision device, comprising:
detecting an input for selecting a heating mode from a plurality of heating modes comprising a first mode and a second mode;
  responsive to detecting the input:
  determining a selected heating mode based on the input;
  causing a heater assembly of the device to begin heating aerosol generating material according to the selected heating mode; and
  causing an indicator assembly to indicate that the device is ready for use within a predetermined period of time after causing the heater assembly to begin heating the aerosol generating material.

According to a third aspect of the present disclosure, there is provided an aerosol provision device, comprising:
an inductor coil for generating a varying magnetic field;
a susceptor arranged to heat aerosol generating material, wherein the susceptor is heatable by penetration with the varying magnetic field;
  an indicator assembly; and
  a controller, configured to:
  cause the inductor coil to begin generating the varying magnetic field; and
  cause the indicator assembly to indicate that the device has finished operating or is about to finish operating within a predetermined period of time after causing the inductor coil to begin heating the aerosol generating material.

Further features and advantages of the invention will become apparent from the following description of preferred embodiments of the invention, given by way of example only, which is made with reference to the accompanying drawings.

DETAILED DESCRIPTION OF THE DRAWINGS

Figure 1:
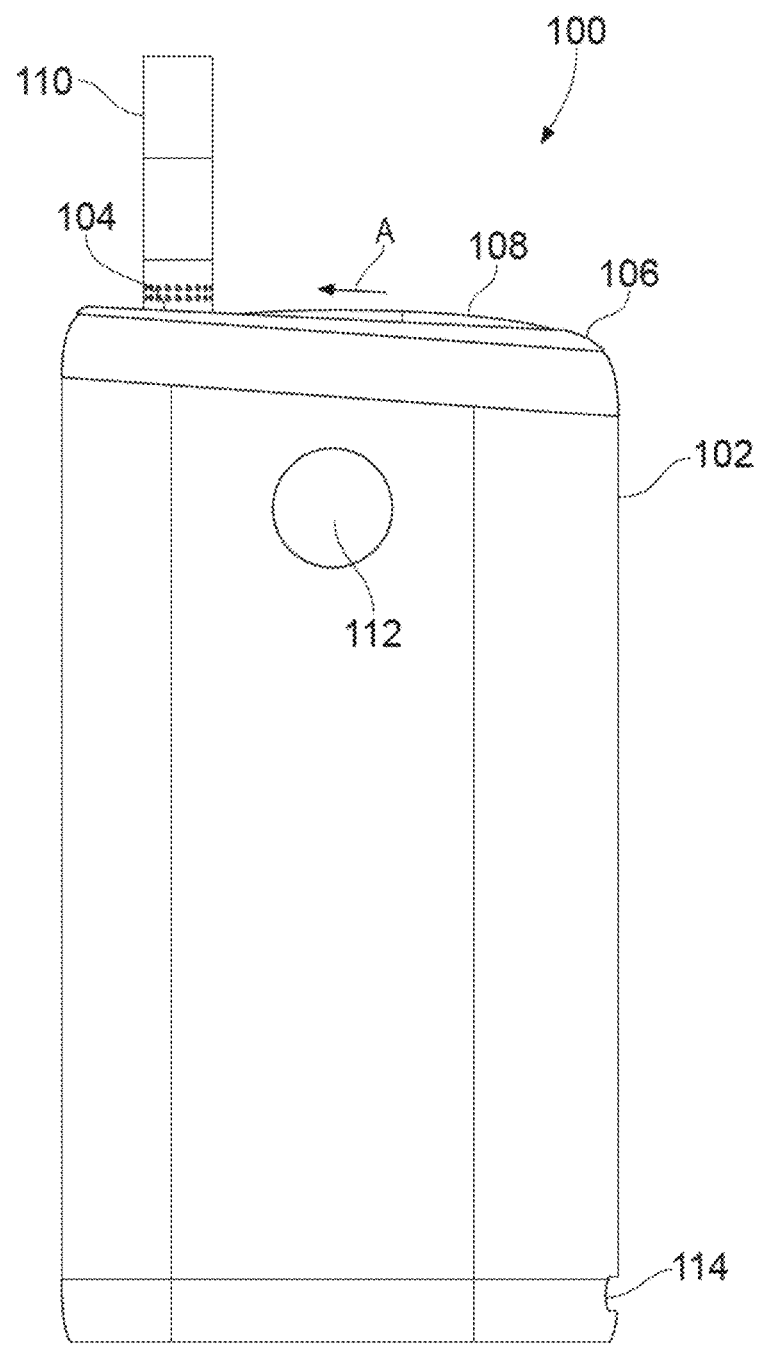
FIG. 1 shows a front view of an example of an aerosol provision device.

As used herein, the term "aerosol generating material" includes materials that provide volatilized components upon heating, typically in the form of an aerosol. Aerosol generating material includes any tobacco-containing material and may, for example, include one or more of tobacco, tobacco derivatives, expanded tobacco, reconstituted tobacco or tobacco substitutes. Aerosol generating material also may include other, non-tobacco, products, which, depending on the product, may or may not contain nicotine. Aerosol generating material may for example be in the form of a solid, a liquid, a gel, a wax or the like. Aerosol generating material may for example also be a combination or a blend of materials. Aerosol generating material may also be known as "smokable material".

Apparatuses are known that heat aerosol generating material to volatilize at least one component of the aerosol generating material, typically to form an aerosol which can be inhaled, without burning or combusting the aerosol generating material. Such an apparatus is sometimes described as an "aerosol generating device," an "aerosol provision device," a "heat-not-burn device," a "tobacco heating product device," or a "tobacco heating device" or similar. Similarly, there are also so-called e-cigarette devices, which typically vaporize an aerosol generating material in the form of a liquid, which may or may not contain nicotine. The aerosol generating material may be in the form of or be provided as part of a rod, cartridge or cassette or the like which can be inserted into the apparatus. A heater for heating and volatilizing the aerosol generating material may be provided as a "permanent" part of the apparatus.

An aerosol provision device can receive an article comprising aerosol generating material for heating. An "article" in this context is a component that includes or contains in use the aerosol generating material, which is heated to volatilize the aerosol generating material, and optionally other components in use. A user may insert the article into the aerosol provision device before it is heated to produce an aerosol, which the user subsequently inhales. The article may be, for example, of a predetermined or specific size that is configured to be placed within a heating chamber of the device which is sized to receive the article.

A first aspect of the present disclosure defines an aerosol provision device comprising an input interface configured to receive an input for selecting a heating mode from a plurality of heating modes comprising a first mode and a second mode. Thus, a user can interact with, or operate the input interface to select a heating mode. The device further comprises a controller that detects the input for selecting the heating mode, and in response to detecting the input the controller determines a selected heating mode based on the input and causes the heater assembly to begin heating the aerosol generating material according to the selected heating mode. The device further comprises an indicator assembly configured to provide an indication that the device is ready for use within a predetermined period of time after causing a heater assembly to begin heating aerosol generating material.

The device therefore begins heating the aerosol generating material only after a particular heating mode has been selected. The device then notifies the user (by providing an indication) that the device is ready for use after a predetermined period of time has passed since the heater assembly began heating.

The device can therefore operate in two or more different heating modes. For example, each heating mode may heat the aerosol generating material to a different temperature, and/or may heat the aerosol generating material for a different length of time. The device may also operate in other, non-heating modes. For example, the device may operate in a settings mode. The heating and non-heating modes may be known more generally as operating modes of the device. The same input interface may be used to receive an input for selecting a settings mode from the plurality of operating modes. Accordingly, the device only begins heating once a heating mode has been selected. This allows the device to be more energy efficient.

Preferably, the controller causes the heater assembly to begin heating the aerosol generating material according to the selected heating mode at substantially the same time as determining the selected heating mode. For example, they may occur simultaneously. This reduces the time the user needs to wait until they begin using the device. In other examples there may be a small delay between these steps, such as less than 1 second, less than 0.5 seconds, less than 0.1 seconds, less than 0.01 seconds, or less than 0.001 seconds.

To ensure that the user is aware the device is ready for use, the aerosol provision device comprises an indicator assembly to indicate that the device is ready for the user to inhale the aerosol. This can avoid having the user wait for longer than necessary to inhale the aerosol, which can waste aerosol and reduce user satisfaction. The predetermined time period may be different for each heating mode.

"Ready for use" may mean that the aerosol generating material has reached a desired/sufficient temperature, or may mean that the aerosol generating material has generated a desired/sufficient volume of aerosol, or may mean that the user can take a first "puff" on the device, to inhale aerosol generated by the aerosol generating material.

The reference to "within a predetermined period time" includes examples where the indicator provides an indication at a predetermined period of time. For example, the characteristics of the article in use with the aerosol provision device and the heating applied by the aerosol provision device may be known, so that the time to be "ready for use" can be predetermined. It also includes examples where some characteristics of the aerosol provision device and/or the article are monitored to determine whether the article is ready for use. For example, a temperature sensor measuring at or above a predetermined temperature may indicate that the device is ready for use.

The heater assembly may be an inductive heater assembly. For example, the heater assembly may comprise one or more inductor coils and a susceptor. The heater assembly may comprise one or more coils to heat a heater component. In another example, the heater assembly may be a resistive heater assembly. For example, one or more components may be heated resistively which heat the aerosol generating material.

In some examples, the predetermined period of time is less than about 30 seconds, or less than about 20 seconds, or less than about 15 seconds, or less than about 10 seconds after causing the heater assembly to begin heating. In other examples, the predetermined period of time is less than about 60 seconds, or less than about 50 seconds, or less than about 40 seconds.

It has been found that certain heating assemblies, such as inductive heating assemblies, are able to heat aerosol generating material to a suitable temperature within a reduced period of time when compared to other types of heating assemblies. Accordingly, a user of the device may be able to draw on the device to inhale the aerosol in a predetermined period of less than about 20 seconds, for example. Because certain heating assemblies are able to heat the aerosol generating material quickly, the aerosol generating material will have released a sufficient amount of aerosol at the time the device indicates that the device is ready.

As mentioned, the device may be configured to operate in one of a first mode and a second mode and when the device is operated in the first mode a component of the heater assembly is to be heated to a first temperature, and when the device is operated in the second mode a component of the heater assembly is to be heated to a second temperature. The second temperature may be higher than the first temperature.

The first temperature may be between about 240° C. and about 260° C. and the second temperature may be between about 270° C. and about 290° C. The temperature of the aerosol generating material may be marginally less than the temperature of the heater component.

The first mode may be known as a default mode, and the second mode may be known as a boost mode. The second mode may, for example, generate a higher volume or concentration of aerosol than the first mode.

In some examples the predetermined period of time is dependent upon the selected heating mode. In some examples, in the second mode the controller is configured to cause the heater assembly to heat a heating component of the heater assembly to a higher temperature than in the first mode. The predetermined period of time is less than the predetermined period of time for when the device is operating in the first mode.

The predetermined period of time is a first predetermined time when the device is operating in the first mode and a second predetermined time when the device is operating in the second mode, the second predetermined time being different than the first predetermined time. In a particular example, the second predetermined time is less than the first predetermined time. For example, if the aerosol generating material is heated to a higher temperature in the second mode, it may release aerosol quicker than if was heated to a lower temperature. This can mean that the device is ready for use quicker.

In some examples, the indicator assembly may indicate the selected heating mode. In some examples this indication is the same indication as that which indicates the device is ready for use. Thus the type of indication used to indicate that the device is ready for use may be based on the selected heating mode. In other examples the indication that indicates the selected heating mode may occur after the heating mode is selected, but before the device is ready for use. Thus, two separate indications may occur. A first indication may indicate the selected heating mode, and a second indication may indicate that the device is ready for use. This can allow the user to cancel the heating if they accidentally select the wrong mode. In a particular example the first indication is provided by a haptic component, and the second indication is provided by a visual component. This is useful because the user may be holding the device when they select the heating mode, but may place the device on a surface as they wait for the device to be ready for use. The visual indication can be more easily seen if the user is no longer holding the device.

The input interface may also be known as a user interface. The input interface may be a button, touch screen, dial, knob, or a wireless connection to a mobile device (e.g. Bluetooth). The interface allows the user to select an operating mode from a plurality of operating modes. The operating modes may include one or more heating modes and/or a settings mode. When an input is received, the input interface can send one or more signals to the controller indicative of the input. Based on the signal(s), the controller can determine a selected operating mode, such as a selected heating or settings mode.

In a particular example, the input interface comprises a button, and the input comprises a signal indicating the button has been released. The controller can receive the input from the input interface. Thus, the heater assembly begins heating the aerosol generating material only once the button has been released. While the user is holding down the button, the heater assembly may not heat the aerosol generating material. The predetermined period of time therefore initiates when a user releases the button. The button may be a software button or a hardware button. The signal may be a single signal, or may be two or more signals.

In a particular example, the input further comprises a signal indicating a length of time that the button has been pressed and the controller is configured to detect the input for selecting a heating mode in response to (i) receiving the signal indicating that the button has been released, and (ii) determining that the length of time that the button has been pressed is greater than or equal to a threshold time period. The signal indicating the length of time that the button has been pressed may be part of the same signal which indicates that the button has been released, or may be a separate signal. For example a signal indicating the length of time, or a signal indicating a button press so the length of time the button is held can be timed by the controller between the button press and the button release signals. Thus, in some examples, the heater assembly may only begin heating if the button is pressed for a certain length of time that is greater than or equal to a threshold time period. In a particular example, the threshold time period is 3 seconds or 5 seconds. If the button is held and released for less than the threshold time period, the heater assembly may not begin heating. This can avoid heating the aerosol generating material if the user accidentally presses of the button, which can waste energy. Thus, if the controller determines that the length of time that the button has been pressed is less than the threshold, the controller determines not to cause the heater assembly to begin heating.

The controller may be configured to determine a selected heating mode based on the length of time the button was pressed. In one example, the device is configured to operate in the first mode if the length of time that the button has been pressed is greater than or equal to a first threshold time period and is less than a second threshold time period, and the device is configured to operate in the second mode if the length of time that the button has been pressed is greater than or equal to the second threshold time period. The first threshold time period may be 3 seconds, and the second threshold time period may be 5 seconds, for example. Thus, using a single button the user can select different modes. Having a single interface to select multiple modes can simplify operation of the device and reduce the number of components. A reduced number of components can make the device more lightweight and there are fewer parts to break or stop functioning.

In some examples the indicator assembly provides an indication that the heater assembly has begun to heat the aerosol generating material. This can avoid the user trying to start operation of the device again.

In one arrangement, the indicator assembly comprises a visual component configured to provide a visual indication that the device is ready for use. For example, the visual component may comprise an LED, a plurality of LEDs, a display, an eInk display, or a mechanical element which moves to display one or more patterns, for example. In some examples, the visual component is configured to emit light.

In a particular example, the indicator assembly comprises a plurality of LEDs, and the number of illuminated LEDs indicates when the device is ready for use. For example, when the heater assembly first begins to heat the aerosol generating material there may be a first number of LEDs illuminated and when the device is ready for use there may be a second number of LEDs illuminated, where the second number is greater than the first number. The first number of LEDs may be zero. The second number may be all of the LEDs. The indicator assembly may therefore indicate how close the device is to being ready for use. The LEDs may be sequentially illuminated during the predetermined period of time.

In a particular example there are four LEDs, and the LEDs are sequentially illuminated during the predetermined period of time. For example, the first LED may be illuminated 5 seconds after causing the heater assembly to heat the aerosol generating material, the second LED may be illuminated 10 seconds after causing the heater assembly to heat the aerosol generating material, the third LED may be illuminated 15 seconds after causing the heater assembly to heat the aerosol generating material and the fourth LED may be illuminated 20 seconds after causing the heater assembly to heat the aerosol generating material. Illumination of the final LED may indicate that the device is ready for use. The earlier illuminated LEDs may remain illuminated as the next LED is illuminated. Alternatively, as the subsequent LEDs is illuminated, the earlier LED may switch off.

In another example, the indicator assembly comprises a haptic component configured to provide haptic feedback to indicate that the device is ready for use. For example, the haptic component may be a haptic motor which causes the device to vibrate when the device is ready for use. In some examples the haptic component provides haptic feedback according to a first pattern after the heater assembly begins to heat the aerosol generating material and provides haptic feedback according to a second pattern when the device is ready for use. The first pattern may last until the device is ready for use or may terminate after a short time. Accordingly, the haptic component may also indicate that the device has begun heating the aerosol generating material so that the user is aware the device is operating.

In another example, the indicator assembly comprises an audible indicator configured to emit sound to indicate that the device is ready for use. The audible indicator may be a transducer, buzzer, beeper, etc.

In a particular example, the indicator assembly comprises a haptic component and a visual component. The haptic component may be configured to provide a haptic indication that the heater assembly has begun heating the aerosol generating material. The visual component may be configured to provide a visual indication that the device is ready for use.

In some examples the indicator assembly is configured to indicate the time left until the device finishes operating. For example, the indicator assembly may provide different indications depending upon the time left until the device finishes operating. The device may "finish operating" at the time the heater assembly stops being powered (i.e. it is no longer actively heating or maintaining a temperature), or at the time the aerosol temperature/volume is considered to fall below an acceptable level, which may be several seconds after point at which the heater assembly has ceased being powered.

In a particular example, the indicator assembly comprises a plurality of LEDs, and the number of illuminated LEDs indicates the time left until the device finishes operating. For example, when the device is operating there may be a first number of LEDs illuminated and when the device has finished operating there may be a second number of LEDs illuminated, where the second number is less than the first number. The second number may be zero, for example. The first number may be all of the LEDs. The LEDs may therefore "count down" as the device gets closer to finishing.

In a particular example there are a plurality of LEDs, such as four LEDs, and the LEDs are sequentially switched off as the end of the heating session approaches. For example, all four LEDs may be illuminated 20 seconds before the device finishes operating. When only 15 seconds remain, one of the four LEDs may be switched off. When only 10 seconds remain, another LED may be switched off. When only 5 seconds remain another LED may be switched off, and when there are 0 seconds remaining all four LEDs may be switched off.

In another example, the haptic component may provide different haptic feedback patterns depending upon the time left. For example, the haptic component may provide haptic feedback to indicate that is a certain period of time remaining. The type of haptic feedback may be indicative of how much time is remaining. For example, when there are 20 seconds remaining, there may be a short, low intensity haptic feedback and when there are 5 seconds or 0 seconds remaining, the haptic feedback may be longer and more intense.

In a further example, the audible indicator may provide different sounds depending upon the time left. For example, the pitch, tone, sound pattern, etc. may change over time.

In another example, the controller is configured to cause the indicator assembly to indicate that the device has finished operating or is about to finish operating within a second predetermined period of time after causing the heater assembly to begin heating the aerosol generating material. Thus, the indicator assembly may indicate the moment at which it finishes operating, or is about to finish operating. For example, the when the device finishes operating the visual indicator may no longer provide any visual indication. In a particular example, all of the LEDs may be switched off when the device has finished operating or is about to finish operating. This indicates to the user that they should cease inhaling from the device. The second predetermined time is longer than predetermined time described above. The second predetermined time may be three minutes, three minutes and thirty seconds, or four minutes for example. The second predetermined time may depend upon the heating mode.

In a particular example, the heater assembly comprises an inductor coil for generating a varying magnetic field and a susceptor arranged to heat the aerosol generating material, wherein the susceptor is heatable by penetration with the varying magnetic field. The controller is configured to cause the heater assembly to begin heating the aerosol generating material according to the selected heating mode by causing the inductor coil to generate the varying magnetic field. Accordingly, the susceptor may be the component of the heater assembly which is heated. For example, in the first mode, the inductor coil may be configured to heat the susceptor to a first temperature. In the second mode, for example, the inductor coil may be configured to heat the susceptor to a second temperature.

It has been found that inductive heating systems are able to heat aerosol generating material to a suitable temperature within a reduced period of time when compared to other types of heating assemblies, such as resistive heating assemblies.

In some examples, the inductor coil is a first inductor coil, and the device further comprises a second inductor coil for generating a second varying magnetic field. In a particular arrangement, the first inductor coil is adjacent the second inductor coil in a direction along the longitudinal axis and the controller is configured to cause the second inductor coil to generate the second varying magnetic field after causing the indicator assembly to indicate that the device is ready for use. In use, the aerosol is drawn along a flow path of the device towards a proximal end of the device, and the first inductor coil is arranged closer to the proximal end of the device than the second inductor coil.

Accordingly, the device may comprise two inductor coils, where the first inductor coil is closer to a mouth end of the device. The first inductor coil therefore heats aerosol generating material which is closer to the mouth of the user. Initially the first inductor coil is operated. The second inductor coil can be operated at a later time. For example, the controller may cause the second inductor coil to generate the second magnetic field at a third predetermined time after causing the first inductor coil to generate the first magnetic field. The third predetermined time may be between about 40 seconds and about 60 seconds, for example. The third predetermined time may depend upon the mode in which the device is operating.

The first inductor coil may continue to generate the first magnetic field while the second inductor coil is generating the second magnetic field.

In a particular example, the first inductor coil has a first length, second inductor coil has a second length, and the first length is shorter than the second length. A shorter length heats a lower volume of aerosol generating material, which generates a lower volume of aerosol, thereby reducing the phenomenon known as "hot puff".

In another aspect, there is provided a method of operating the aerosol provision device described above. The method comprises detecting an input for selecting a heating mode from a plurality of heating modes comprising a first mode and a second mode and responsive to detecting the input: (i) determining a selected heating mode based on the input, (ii) causing a heater assembly of the device to begin heating aerosol generating material according to the selected heating mode, and (iii) causing an indicator assembly to indicate that the device is ready for use within a predetermined period of time after causing the heater assembly to begin heating the aerosol generating material.

In the second mode the method may comprise causing the heater assembly to heat a heating component of the heater assembly to a higher temperature than in the first mode. The predetermined period of time is less than the predetermined period of time for when the device is operating in the first mode.

Detecting an input for selecting a heating mode may comprise detecting that a button has been released. Detecting an input for selecting a heating mode may further comprise detecting a length of time that the button has been pressed, and the selected heating mode is determined based on the length of time that the button has been pressed.

The method may further comprise causing the indicator assembly to indicate that the device has finished operating or is about to finish operating within a predetermined period of time after causing the heater assembly to begin heating the aerosol generating material.

Although this method is described in relation to any type of heater assembly, it will be appreciated that this method may also be applied to a device with an inductive heater assembly.

In another aspect, an aerosol provision device comprises an inductor coil for generating a varying magnetic field, a susceptor arranged to heat aerosol generating material, wherein the susceptor is heatable by penetration with the varying magnetic field, an indicator assembly, and a controller. The controller is configured to cause the inductor coil to begin generating the varying magnetic field, and cause the indicator assembly to indicate that the device has finished operating or is about to finish operating within a predetermined period of time after causing the inductor coil to begin heating the aerosol generating material. Thus the user can be informed when the device has finished operating or is about to finish operating. This stops the user from continuing to use the device when the aerosol generated may no longer be of sufficient volume, concentration or temperature.

In another aspect, a method of operating an aerosol provision device, comprises causing an inductor coil of the aerosol provision device to generate a varying magnetic field for heating a susceptor and causing an indicator assembly of the aerosol provision device to indicate that the device has finished operating or is about to finish operating within a predetermined period of time after causing the inductor coil assembly to begin heating the aerosol generating material.

Although this method is described in relation to an inductive heater, it will be appreciated that this method may also be applied to a device with a non-inductive heater assembly. For example, instead of an inductor coil, the device may comprise a heater assembly configured to heat aerosol generating material.

In a particular example, the indicator assembly comprises one or more Light Emitting Diodes (LEDs) and an outer member positioned above the one or more LEDs. The outer member comprises a plurality of apertures visible from outside the aerosol provision device. Electromagnetic radiation (in the form of visible light for example) can pass through the plurality of apertures and be viewed by a user. At least a portion of the outer member may form an outer surface of the device.

The indicator assembly may further comprise a light-shaping member positioned between the one or more LED and the outer member. The light shaping member may comprise one or more light pipes to guide light through the light-shaping member to produce a particular pattern or design. The light-shaping member may comprise opaque regions configured to block a portion of the light from the LEDs. The light-shaping member may comprise transparent or translucent regions to allow the light to pass through. The light-shaping member may alternatively comprise openings to allow the light to pass through. A light-shaping member that comprises opaque regions and transparent or translucent regions may be more robust than a light-shaping member with openings. Translucent regions can also additionally diffuse/soften the light.

In some examples, the light shaping member is formed from two or more overmolded components. For example, the opaque and transparent/translucent regions may be formed from two overmolded components.

In one example, the light-shaping member comprises an opaque region extending around the periphery/perimeter/circumference of the light-shaping member. This can prevent light from leaking around the outside of the outer member. The opaque region may be an outer ring.

In one example the opaque region is colored black or dark grey.

In one example, the opaque region is cross-shaped.

In a specific example, the device comprises four LEDs, wherein each of the four LEDs is located below the light-shaping member and are positioned between adjacent opaque regions such that the light from the LEDs separates into 4 quadrants. The opaque regions are configured to prevent light bleed from one quadrant to the adjacent quadrant.

Preferably, the device is a tobacco heating device, also known as a heat-not-burn device.

FIG. 1 shows an example of an aerosol provision device 100 for generating aerosol from an aerosol generating medium/material. In broad outline, the device 100 may be used to heat a replaceable article 110 comprising the aerosol generating medium, to generate an aerosol or other inhalable medium which is inhaled by a user of the device 100.

The device 100 comprises a housing 102 (in the form of an outer cover) which surrounds and houses various components of the device 100. The device 100 has an opening 104 in one end, through which the article 110 may be inserted for heating by a heating assembly. In use, the article 110 may be fully or partially inserted into the heating assembly where it may be heated by one or more components of the heater assembly.

The device 100 of this example comprises a first end member 106 which comprises a lid 108 which is moveable relative to the first end member 106 to close the opening 104 when no article 110 is in place. In FIG. 1, the lid 108 is shown in an open configuration, however the cap 108 may move into a closed configuration. For example, a user may cause the lid 108 to slide in the direction of arrow "A".

The device 100 may also include an input interface 112, which may comprise a button or switch, which operates the device 100 when pressed. For example, a user may turn on the device 100 by operating the input interface 112.

The device 100 may also comprise an electrical connector/component, such as a socket/port 114, which can receive a cable to charge a battery of the device 100. For example, the socket 114 may be a charging port, such as a USB charging port. In some examples the socket 114 may be used additionally or alternatively to transfer data between the device 100 and another device, such as a computing device.

Figure 2:
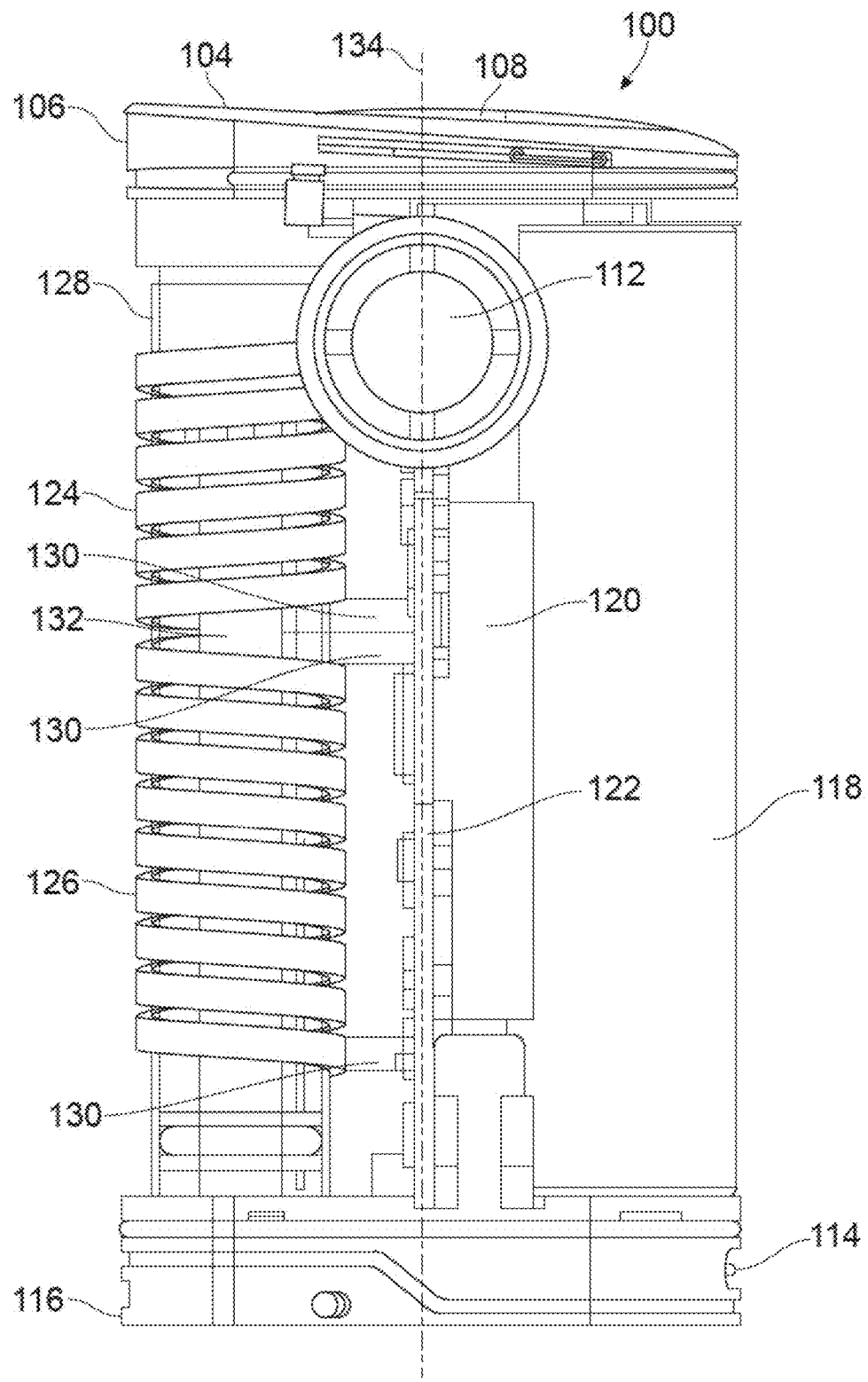
FIG. 2 shows a front view of the aerosol provision device of FIG. 1 with an outer cover removed.

FIG. 2 depicts the device 100 of FIG. 1 with the outer cover 102 removed and without an article 110 present. The device 100 defines a longitudinal axis 134.

As shown in FIG. 2, the first end member 106 is arranged at one end of the device 100 and a second end member 116 is arranged at an opposite end of the device 100. The first and second end members 106, 116 together at least partially define end surfaces of the device 100. For example, the bottom surface of the second end member 116 at least partially defines a bottom surface of the device 100. Edges of the outer cover 102 may also define a portion of the end surfaces. In this example, the lid 108 also defines a portion of a top surface of the device 100.

The end of the device closest to the opening 104 may be known as the proximal end (or mouth end) of the device 100 because, in use, it is closest to the mouth of the user. In use, a user inserts an article 110 into the opening 104, operates the user control 112 to begin heating the aerosol generating material and draws on the aerosol generated in the device. This causes the aerosol to flow through the device 100 along a flow path towards the proximal end of the device 100.

The other end of the device furthest away from the opening 104 may be known as the distal end of the device 100 because, in use, it is the end furthest away from the mouth of the user. As a user draws on the aerosol generated in the device, the aerosol flows away from the distal end of the device 100.

The device 100 further comprises a power source 118. The power source 118 may be, for example, a battery, such as a rechargeable battery or a non-rechargeable battery. Examples of suitable batteries include, for example, a lithium battery (such as a lithium-ion battery), a nickel battery (such as a nickel-cadmium battery), and an alkaline battery. The battery is electrically coupled to the heating assembly to supply electrical power when required and under control of a controller (not shown) to heat the aerosol generating material. In this example, the battery is connected to a central support 120 which holds the battery 118 in place. The central support 120 may also be known as a battery support, or battery carrier.

The device further comprises at least one electronics module 122. The electronics module 122 may comprise, for example, a printed circuit board (PCB). The PCB 122 may support at least one controller, such as a processor, and memory. The PCB 122 may also comprise one or more electrical tracks to electrically connect together various electronic components of the device 100. For example, the battery terminals may be electrically connected to the PCB 122 so that power can be distributed throughout the device 100. The socket 114 may also be electrically coupled to the battery via the electrical tracks.

In the example device 100, the heating assembly is an inductive heating assembly and comprises various components to heat the aerosol generating material of the article 110 via an inductive heating process. Induction heating is a process of heating an electrically conducting object (such as a susceptor) by electromagnetic induction. An induction heating assembly may comprise an inductive element, for example, one or more inductor coils, and a device for passing a varying electric current, such as an alternating electric current, through the inductive element. The varying electric current in the inductive element produces a varying magnetic field. The varying magnetic field penetrates a susceptor suitably positioned with respect to the inductive element, and generates eddy currents inside the susceptor. The susceptor has electrical resistance to the eddy currents, and hence the flow of the eddy currents against this resistance causes the susceptor to be heated by Joule heating. In cases where the susceptor comprises ferromagnetic material such as iron, nickel or cobalt, heat may also be generated by magnetic hysteresis losses in the susceptor, i.e. by the varying orientation of magnetic dipoles in the magnetic material as a result of their alignment with the varying magnetic field. In inductive heating, as compared to heating by conduction for example, heat is generated inside the susceptor, allowing for rapid heating. Further, there need not be any physical contact between the inductive heater and the susceptor, allowing for enhanced freedom in construction and application.

The induction heating assembly of the example device 100 comprises a susceptor arrangement 132 (herein referred to as "a susceptor"), a first inductor coil 124 and a second inductor coil 126. The first and second inductor coils 124, 126 are made from an electrically conducting material. In this example, the first and second inductor coils 124, 126 are made from litz wire/cable which is wound in a helical fashion to provide helical inductor coils 124, 126. Litz wire comprises a plurality of individual wires which are individually insulated and are twisted together to form a single wire. Litz wires are designed to reduce the skin effect losses in a conductor. In the example device 100, the first and second inductor coils 124, 126 are made from copper litz wire which has a rectangular cross section. In other examples the litz wire can have other shape cross sections, such as circular.

The first inductor coil 124 is configured to generate a first varying magnetic field for heating a first section of the susceptor 132 and the second inductor coil 126 is configured to generate a second varying magnetic field for heating a second section of the susceptor 132. In this example, the first inductor coil 124 is adjacent to the second inductor coil 126 in a direction along the longitudinal axis 134 of the device 100 (that is, the first and second inductor coils 124, 126 to not overlap). The susceptor arrangement 132 may comprise a single susceptor, or two or more separate susceptors. Ends 130 of the first and second inductor coils 124, 126 can be connected to the PCB 122.

It will be appreciated that the first and second inductor coils 124, 126, in some examples, may have at least one characteristic different from each other. For example, the first inductor coil 124 may have at least one characteristic different from the second inductor coil 126. More specifically, in one example, the first inductor coil 124 may have a different value of inductance than the second inductor coil 126. In FIG. 2, the first and second inductor coils 124, 126 are of different lengths such that the first inductor coil 124 is wound over a smaller section of the susceptor 132 than the second inductor coil 126. Thus, the first inductor coil 124 may comprise a different number of turns than the second inductor coil 126 (assuming that the spacing between individual turns is substantially the same). In yet another example, the first inductor coil 124 may be made from a different material to the second inductor coil 126. In some examples, the first and second inductor coils 124, 126 may be substantially identical.

In this example, the first inductor coil 124 and the second inductor coil 126 are wound in opposite directions. This can be useful when the inductor coils are active at different times. For example, initially, the first inductor coil 124 may be operating to heat a first section of the article 110, and at a later time, the second inductor coil 126 may be operating to heat a second section of the article 110. Winding the coils in opposite directions helps reduce the current induced in the inactive coil when used in conjunction with a particular type of control circuit. In FIG. 2, the first inductor coil 124 is a right-hand helix and the second inductor coil 126 is a left-hand helix. However, in another embodiment, the inductor coils 124, 126 may be wound in the same direction, or the first inductor coil 124 may be a left-hand helix and the second inductor coil 126 may be a right-hand helix.

The susceptor 132 of this example is hollow and therefore defines a receptacle within which aerosol generating material is received. For example, the article 110 can be inserted into the susceptor 132. In this example the susceptor 120 is tubular, with a circular cross section.

The device 100 of FIG. 2 further comprises an insulating member 128 which may be generally tubular and at least partially surround the susceptor 132. The insulating member 128 may be constructed from any insulating material, such as plastic for example. In this particular example, the insulating member is constructed from polyether ether ketone (PEEK). The insulating member 128 may help insulate the various components of the device 100 from the heat generated in the susceptor 132.

The insulating member 128 can also fully or partially support the first and second inductor coils 124, 126. For example, as shown in FIG. 2, the first and second inductor coils 124, 126 are positioned around the insulating member 128 and are in contact with a radially outward surface of the insulating member 128. In some examples the insulating member 128 does not abut the first and second inductor coils 124, 126. For example, a small gap may be present between the outer surface of the insulating member 128 and the inner surface of the first and second inductor coils 124, 126.

In a specific example, the susceptor 132, the insulating member 128, and the first and second inductor coils 124, 126 are coaxial around a central longitudinal axis of the susceptor 132.

Figure 3:
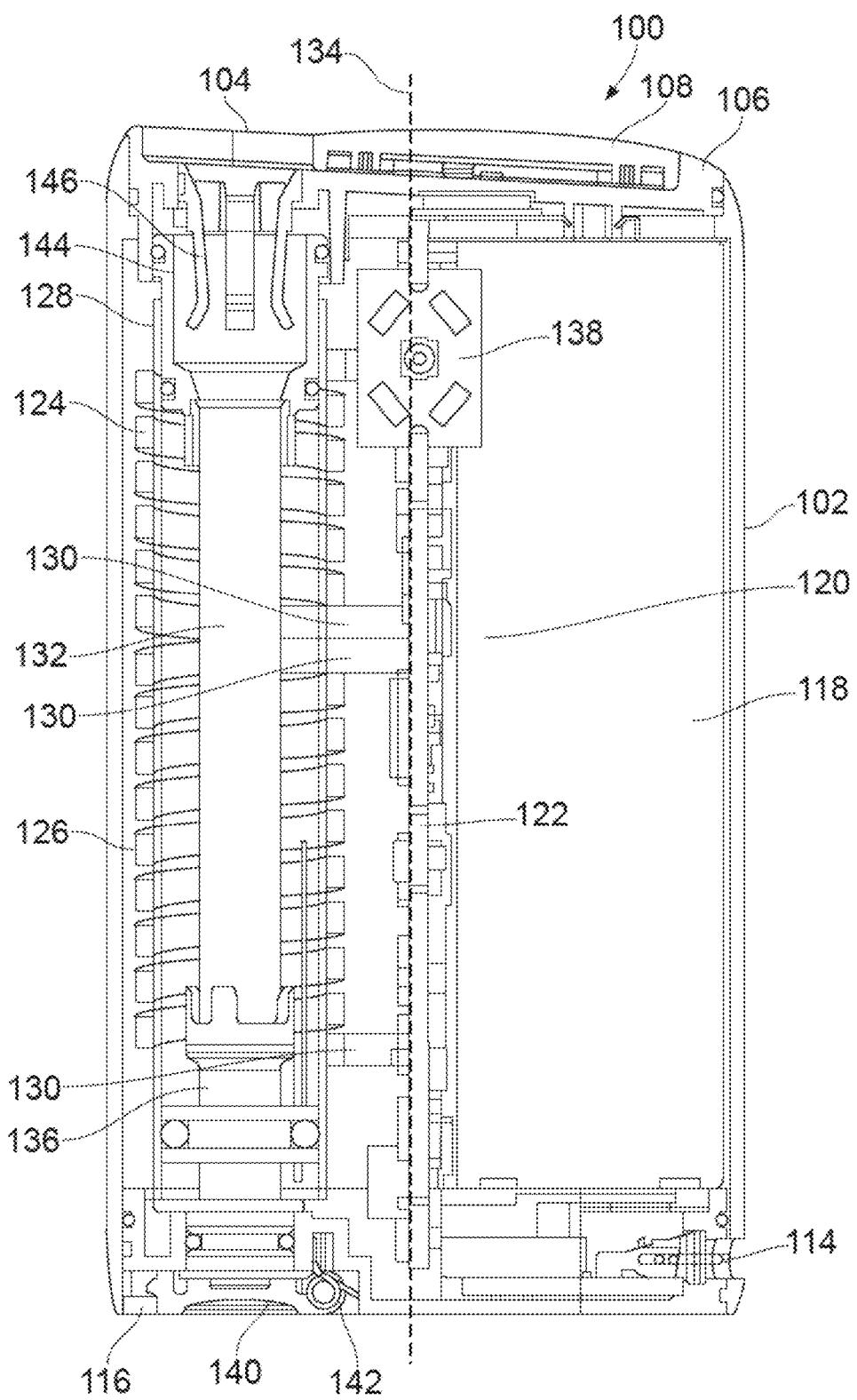
FIG. 3 shows a cross-sectional view of the aerosol provision device of FIG. 1.

FIG. 3 shows a side view of device 100 in partial cross-section. The outer cover 102 is present in this example. The rectangular cross-sectional shape of the first and second inductor coils 124, 126 is more clearly visible.

The device 100 further comprises a support 136 which engages one end of the susceptor 132 to hold the susceptor 132 in place. The support 136 is connected to the second end member 116.

The device may also comprise a second printed circuit board 138 associated within the input interface 112.

The device 100 further comprises a second lid/cap 140 and a spring 142, arranged towards the distal end of the device 100. The spring 142 allows the second lid 140 to be opened, to provide access to the susceptor 132. A user may open the second lid 140 to clean the susceptor 132 and/or the support 136.

The device 100 further comprises an expansion chamber 144 which extends away from a proximal end of the susceptor 132 towards the opening 104 of the device. Located at least partially within the expansion chamber 144 is a retention clip 146 to abut and hold the article 110 when received within the device 100. The expansion chamber 144 is connected to the end member 106.

Figure 4:
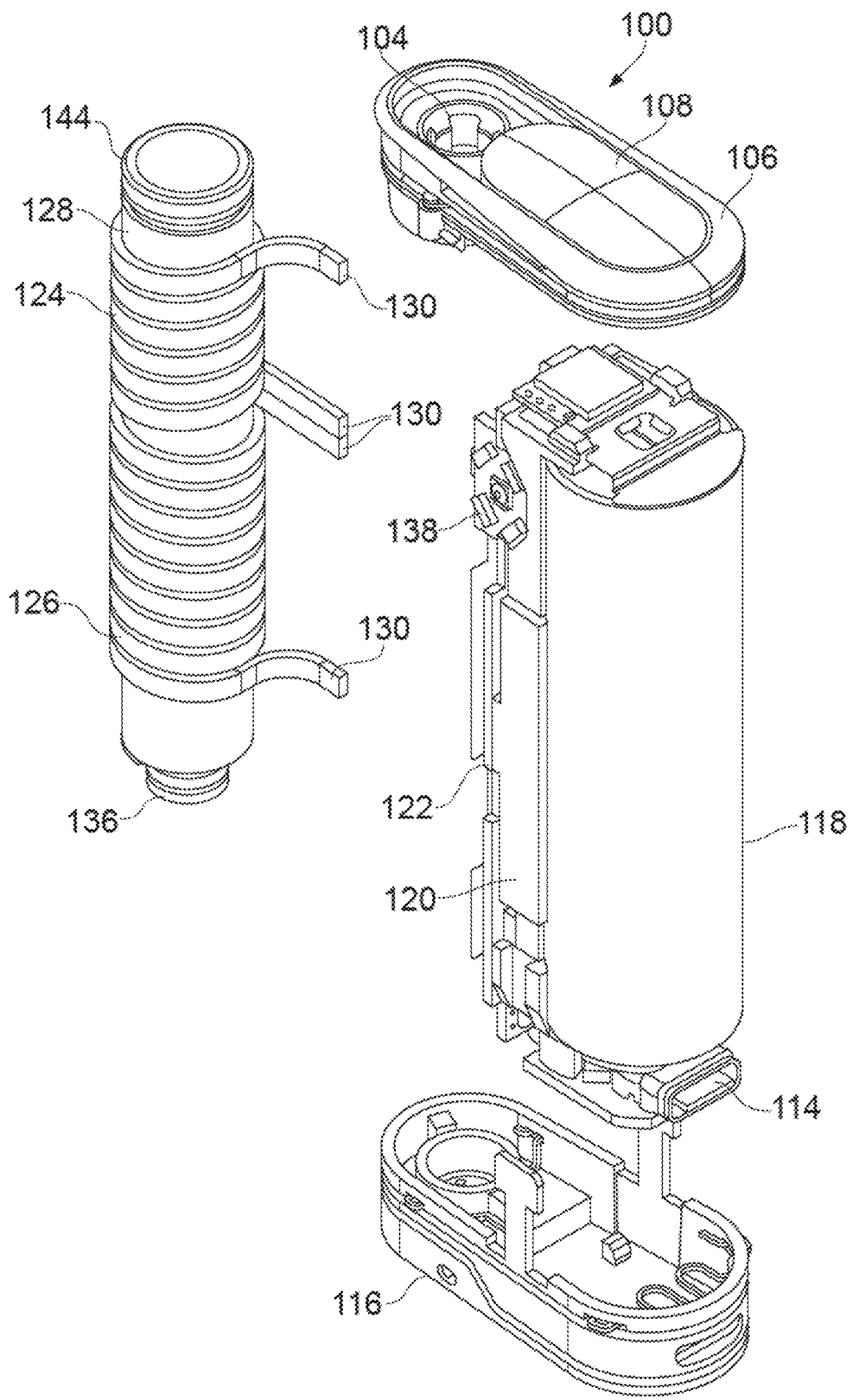
FIG. 4 shows an exploded view of the aerosol provision device of FIG. 2.

FIG. 4 is an exploded view of the device 100 of FIG. 1, with the outer cover 102 omitted.

Figures 5A, 5B:
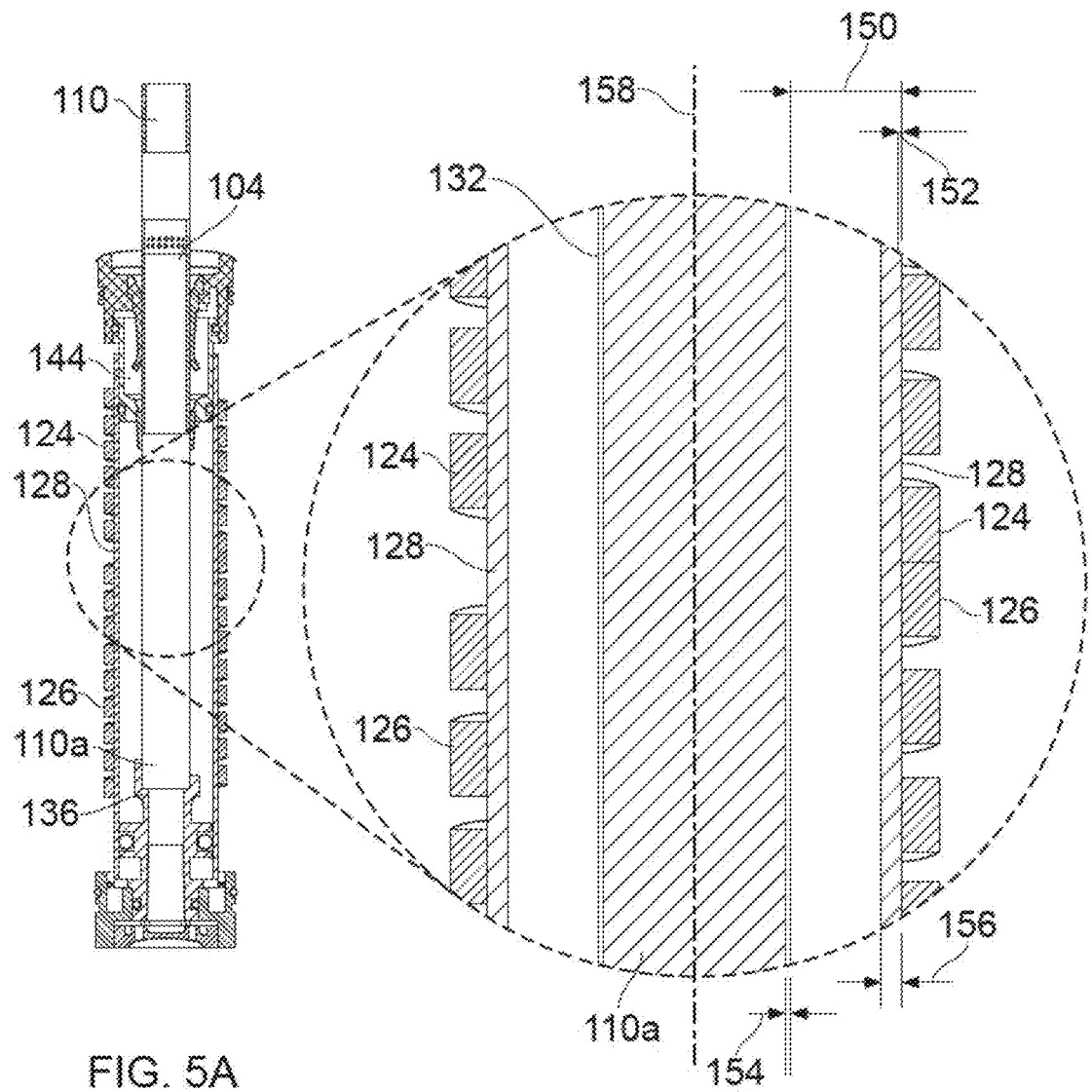
FIG. 5A shows a cross-sectional view of a heating assembly within an aerosol provision device.
FIG. 5B shows a close-up view of a portion of the heating assembly of FIG. 5A.

FIG. 5A depicts a cross section of a portion of the device 100 of FIG. 1. FIG. 5B depicts a close-up of a region of FIG. 5A. FIGS. 5A and 5B show the article 110 received within the susceptor 132, where the article 110 is dimensioned so that the outer surface of the article 110 abuts the inner surface of the susceptor 132. This ensures that the heating is most efficient. The article 110 of this example comprises aerosol generating material 110a. The aerosol generating material 110a is positioned within the susceptor 132. The article 110 may also comprise other components such as a filter, wrapping materials and/or a cooling structure.

FIG. 5B shows that the outer surface of the susceptor 132 is spaced apart from the inner surface of the inductor coils 124, 126 by a distance 150, measured in a direction perpendicular to a longitudinal axis 158 of the susceptor 132. In one particular example, the distance 150 is about 3 mm to 4 mm, about 3 mm to 3.5 mm, or about 3.25 mm.

FIG. 5B further shows that the outer surface of the insulating member 128 is spaced apart from the inner surface of the inductor coils 124, 126 by a distance 152, measured in a direction perpendicular to a longitudinal axis 158 of the susceptor 132. In one particular example, the distance 152 is about 0.05 mm. In another example, the distance 152 is substantially 0 mm, such that the inductor coils 124, 126 abut and touch the insulating member 128.

In one example, the susceptor 132 has a wall thickness 154 of about 0.025 mm to 1 mm, or about 0.05 mm.

In one example, the susceptor 132 has a length of about 40 mm to 60 mm, about 40 mm to 45 mm, or about 44.5 mm.

In one example, the insulating member 128 has a wall thickness 156 of about 0.25 mm to 2 mm, about 0.25 mm to 1 mm, or about 0.5 mm.

Figure 6:
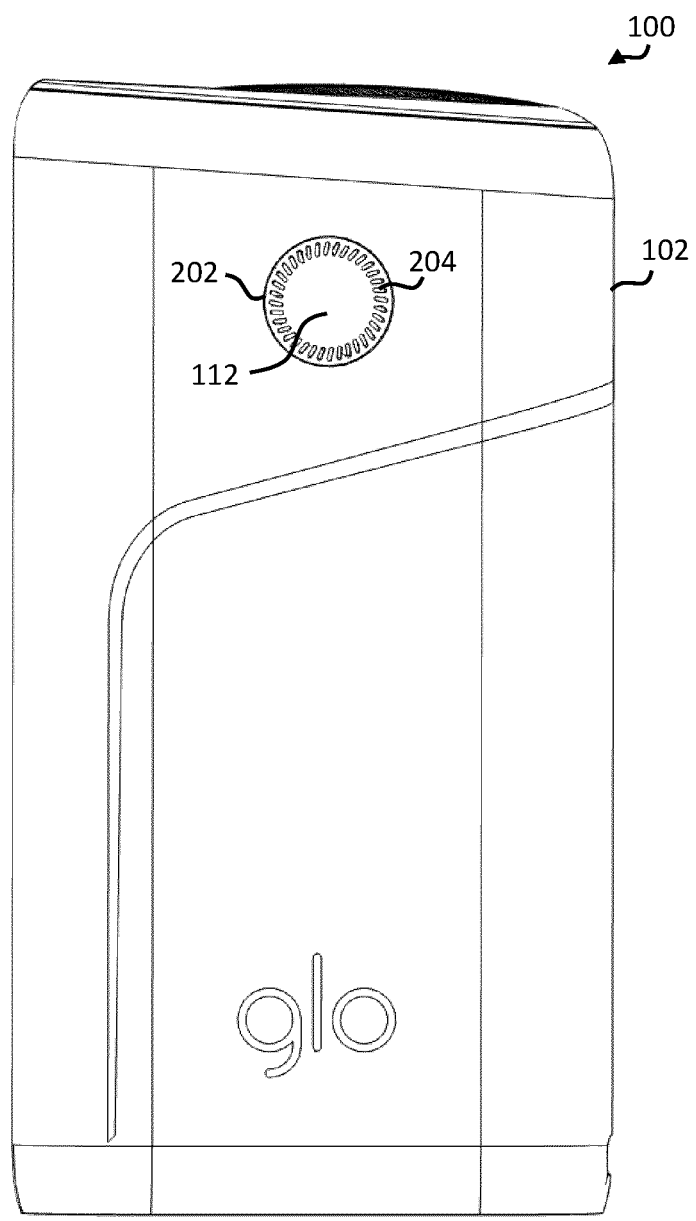
FIG. 6 shows a front view of the device.

FIG. 6 depicts a front view of the device 100. As briefly mentioned above, the device may comprise an input interface 112. In some examples the user may interact with the input interface 112 to operate the device 100. Arranged in proximity to the input interface 112 may be an indicator assembly, which can indicate the occurrence of one or more events to a user, such as when the device is ready for use and/or when the device has finished operating. The indicator assembly may also indicate a mode in which the device 100 is operating.

FIG. 6 depicts an outer member 202 positioned above (i.e. in front of) an indicator assembly. In other examples, the indicator assembly may be positioned elsewhere on the device. In the examples described herein, the indicator assembly comprises a visual component configured to provide a visual indication. The visual component comprises a plurality of LEDs which emit electromagnetic radiation, such as light, to indicate certain events to a user. It will be appreciated that indicator assembly may additionally or alternatively comprise a haptic component or an audible indicator. In the present device 100, the indicator assembly comprises a visual component and a haptic component.

The outer member 202 forms the outermost component of the input interface 112. A user may press the outer member 202 to interact with the device 100. As will be described in more detail below, the outer member 202 comprises a plurality of apertures 204 through which light from a plurality of LEDs can pass.

Figure 7:
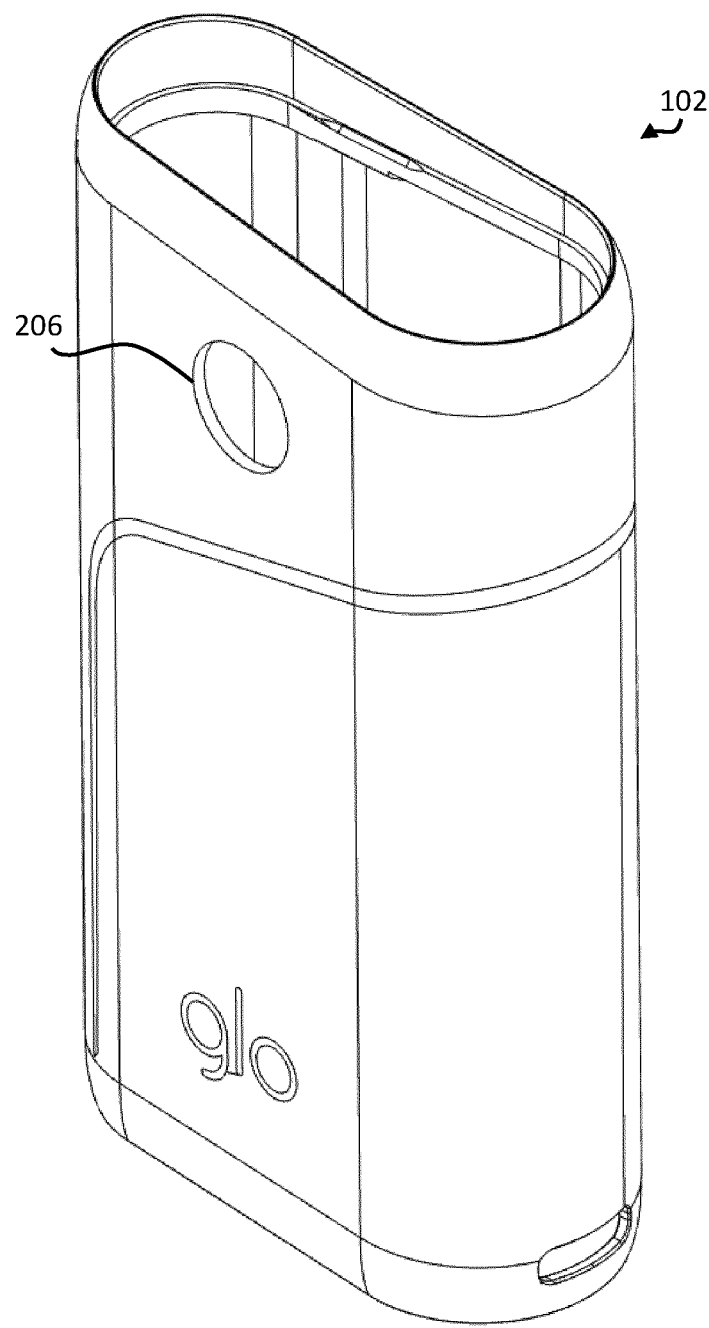
FIG. 7 shows a perspective view of the housing of the device.

FIG. 7 depicts the housing 102 (also known as the outer cover) of the device 100. The housing 102 delimits an opening 206. The outer member (not shown in FIG. 7) can be arranged within the opening 206. For example, the outer member may be arranged flush with the outer surface of the housing 102, or may be raised above or below the outer surface of the housing 102.

Figure 8:
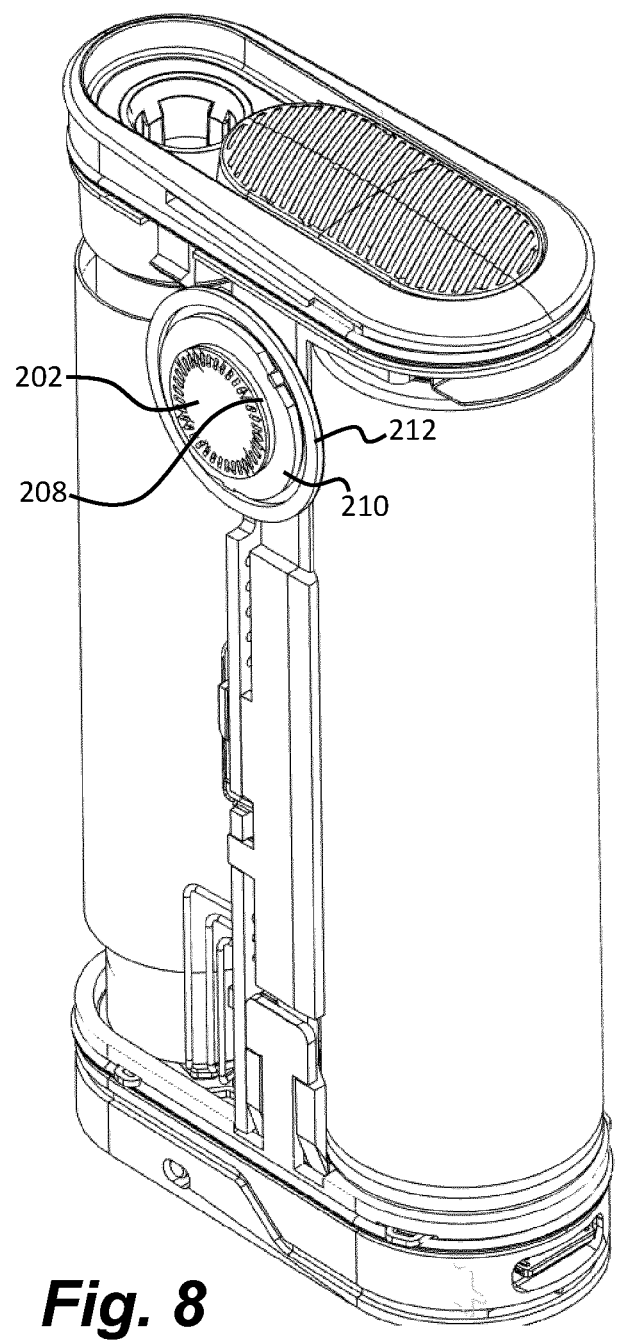
FIG. 8 shows a perspective view of the device without the housing.

FIG. 8 depicts the device 100 without the housing 102 in place. In this example, the outer member 202 is adhered to a light-shaping member 210 via an adhesive layer 208. The adhesive in the adhesive layer 208 may partially or fully cover an inner surface of the outer member 202. Extending around the light-shaping member 210 is a sealing member 212.

In some examples the outer member 202, the adhesive layer 208, the light-shaping member 210 and sealing member 212 may be omitted from the device.

Figure 9:
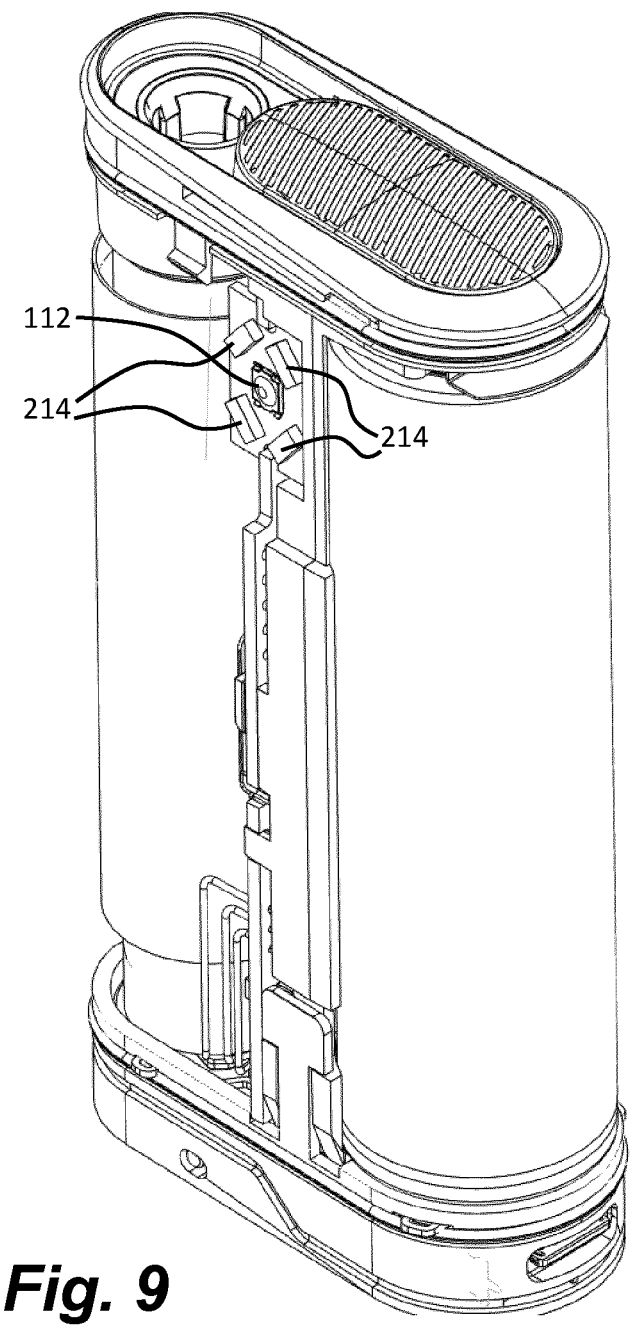
FIG. 9 depicts a perspective view of LEDs arranged within the device.

FIG. 9 depicts the device 100 with the outer member 202, light-shaping member 210 and sealing member 212 removed. The device 100 comprises a visual component comprising four LEDs 214, although in other examples there may be other numbers of LEDs, such as one or more LEDs 214. The LEDs 214 are positioned below the outer member 202 such that light travels from the LEDs 214 through the plurality of apertures 204 formed in the outer member 202. The light therefore also passes through the light-shaping member 210 and the adhesive layer 208. There may also be one or more additional components arranged between the LEDs 214 and the outer member 202.

In the example of FIG. 9, the LEDs 214 are arranged around the input interface 112 which is configured to detect interactions from a user. For example, a user may press or otherwise operate the outer member 202 which in turn is detected by the input interface 112. The input interface 112 may be button or switch which is operated when a force is applied by the user to the outer member 202. In another example the input interface 112 and the outer member 202 may be part of a capacitive sensor which detects when a user touches the outer member 202.

Figure 10:
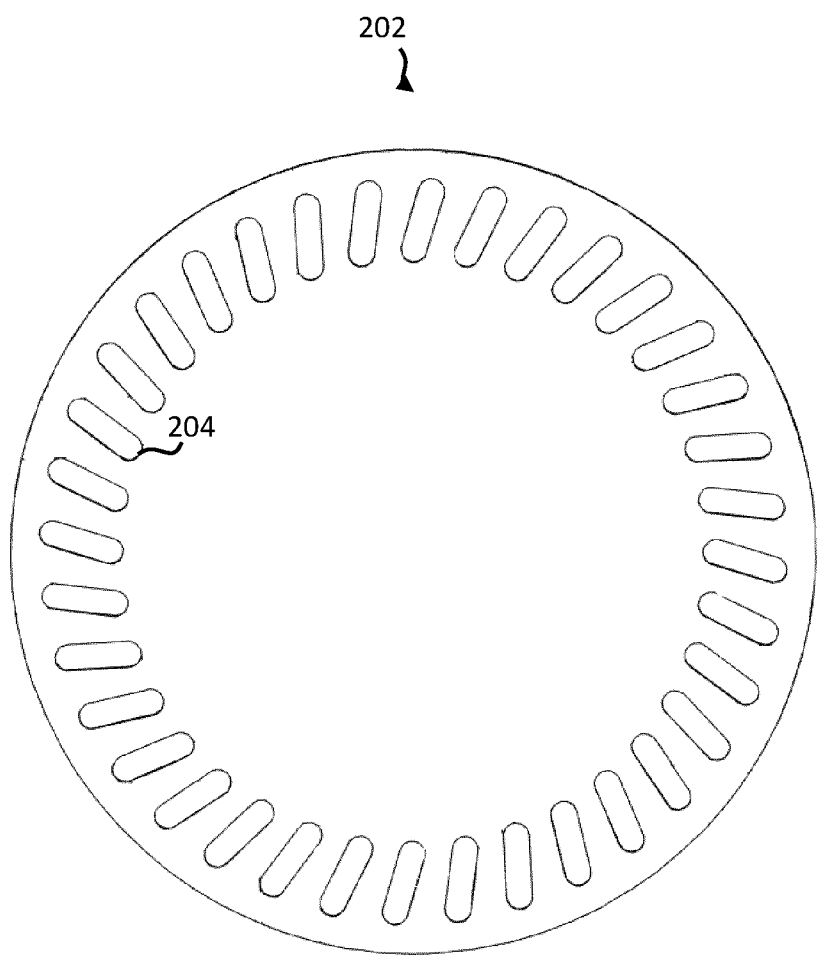
FIG. 10 shows an outer member comprising a plurality of apertures.

FIG. 10 depicts a front view of the outer member 202. As mentioned, the outer member 202 defines a plurality of apertures 204. In this example, the apertures 204 each form slots with a length and a width.

Preferably, the apertures 204 are arranged towards the perimeter/periphery/outer circumference of the outer member 202. As shown in FIG. 10, the apertures 204 are arranged closer to the periphery of the outer member 202 than the center of the outer member 202. This can allow the apertures 204 to be exposed (and therefore light to be seen) even when the user is pressing the outer member 202. The user may be more likely to press/hold the center of the outer member 202 rather than an edge of the outer member 202.

Figure 11:
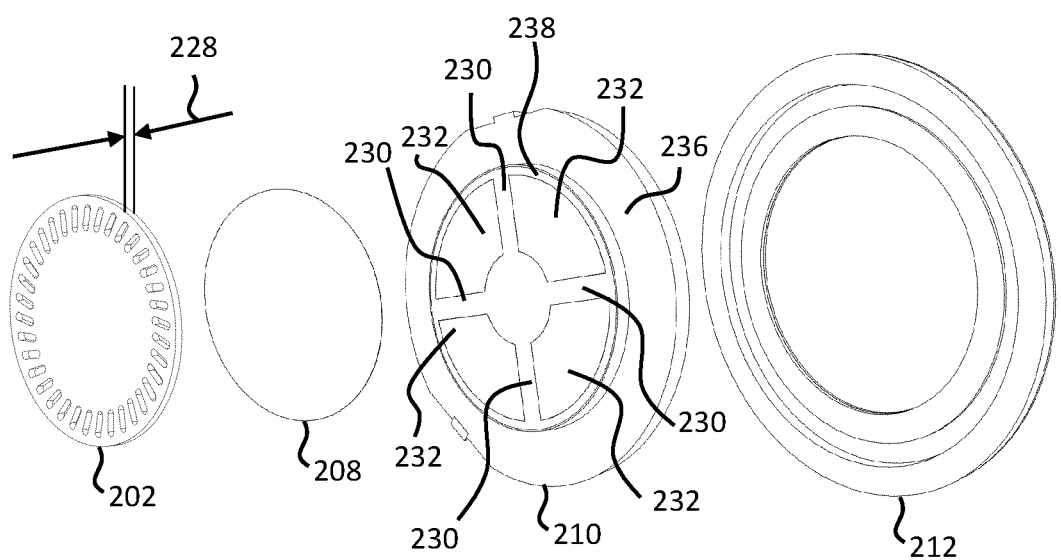
FIG. 11 shows components of the device arranged above the LEDs.

FIG. 11 is an exploded diagram showing some of the components of the device 100. As mentioned, the device 100 may comprise an adhesive layer 208 arranged between the LEDs 214 and the outer member 202. In the example shown, the adhesive layer is the same shape and size as the outer member 202 such that the adhesive covers the apertures 204. Light can then pass through the adhesive layer 208 before passing through the apertures 204. The adhesive layer 208 can therefore be transparent or translucent. A translucent adhesive layer 208 can help diffuse the light from the LEDs such that "hot spots" are avoided. A hot spot is a region where the light has a higher intensity than surrounding regions.

In some examples, the outer member 202 is attached to a light-shaping member 210 via the adhesive layer 208. In the example shown, the light shaping-member 210 comprises one or more opaque regions 230 (which may be joined together) and one or more translucent or transparent regions 232 (which may also be joined together). The translucent or transparent regions 232 may be known as light-pipes since they guide light through the light-shaping member 210. Light from the LEDs 214 can pass through the translucent or transparent regions 232 but is blocked by opaque regions 230. The opaque regions 230 therefore reduce the intensity of light passing through a subset of the apertures 204 (i.e. those arranged above the opaque regions 230). The opaque regions 230 and the translucent or transparent regions 232 may be regions of a single monolithic component, but one or both regions may have been treated to give the region its specific optical property. In another example, the opaque regions 230 and the translucent or transparent regions 232 are separate components which are overmolded.

In this example, the light-shaping member comprises an opaque region 238 extending around the periphery/perimeter/circumference of the light-shaping member 210. This can prevent light from leaking around the outside of the outer member 202. The opaque region may be an outer ring, for example.

In the present example, the device 100 comprises four LEDs 214, and each of the LEDs 214 is positioned between adjacent opaque regions 230 such that the light from the LEDs separates into 4 quadrants. In other words, the LEDs 214 may be arranged below the transparent or translucent regions. By separating the light into the different regions, different indications can be provided to a user. For example, the number of illuminated quadrants can specify certain events to a user. Accordingly, light may be blocked by the opaque regions such that the light may not pass through some of the apertures.

In some examples the regions between the opaque regions 230 are openings and therefore do not comprise translucent or transparent material.

Arranged between the light-shaping member 210 and the LEDs 214 is a sealing member 212, such as a gasket. The sealing member 212 has an outer diameter that is larger than the outer diameters of the outer member 202 and the light shaping member 210. In some examples the sealing member 210 abuts an inner surface of the housing 102 to stop liquid and dust from entering the device 100.

Indicating that the Device is Ready for Use

Figure 12:
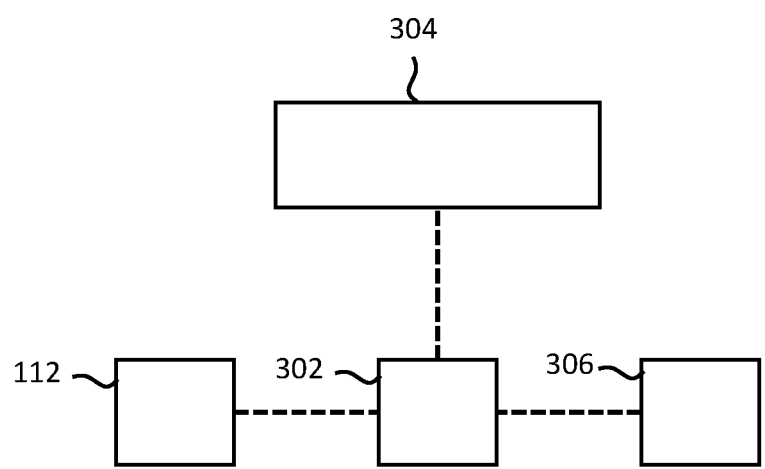
FIG. 12 shows a system comprising a controller, a heater assembly, an input interface and an indicator assembly.

FIG. 12 depicts a system comprising a controller 302 (such as one or more processors), a heater assembly 304, an indicator assembly 306 and the input interface 112. The controller 302 is communicatively coupled to the heater assembly 304, the indicator assembly 306 and the input interface 112 via one or more wired or wireless connections (shown as dashed lines).

The controller 302 may be located on the PCB 122, for example. The controller 302 can control operations of the device 100, such as causing the heater assembly 304 to heat aerosol generating material. In some examples, the controller 302 receives signals from the input interface 112, and responsively controls the heater assembly 304 and indicator assembly 306. A user can provide an input to the input interface 112 to operate the device. In certain examples a heating mode is selected via the input interface 112.

As mentioned above, the indicator assembly 306 can indicate the occurrence of one or more events to a user. To cause the indicator assembly 306 to provide an indication, the controller 302 can send a signal or instruction to the indicator assembly 306. In the examples of FIGS. 6-11, the indicator assembly 306 comprises a visual component comprising a plurality of LEDs 214. It will be appreciated that the following discussion can be applied to other types of indicator assembly 306.

In the following examples, the heater assembly 304 comprises one or more inductor coils which generate one or more magnetic fields to heat a susceptor. The controller 302 can cause the inductor coil(s) of the device 100 to generate a varying magnetic field. For example, the controller 302 can send one or more signals to the inductor coil(s). Once the inductor coil(s) have begun generating the varying magnetic field, the susceptor 132 is heated, which in turn heats any aerosol generating material located near to the susceptor 132. It will be appreciated that the following description may also apply to other types of heater assembly 304.

The controller 302 may cause one or more inductor coils to heat the susceptor to between about 240° C. and about 290° C. In a specific example, the device is configured to operate in one of a first mode and a second mode, where the first and second modes are heating modes. In one example, when the device is operating in a first (default) mode, the controller 302 may cause the first inductor coil 124 to heat a first region of the susceptor 132 to between about 240° C. and about 260° C., such as about 250° C. In another example, the device may be operating in a second (boost) mode, and the controller 302 may cause the first inductor coil 124 to heat a first region of the susceptor 132 to between about 270° C. and about 290° C., such as about 280° C.

The second inductor coil 126 may generate a second magnetic field at a later time during the heating session. For example, the second inductor coil 126 may generate the second magnetic field between about 60 seconds and about 130 seconds after the first inductor coil 124 generates a first magnetic field. The second inductor coil is arranged to heat a second region of the susceptor 132. In some examples, both inductor coils 124, 126 operate at the same time.

After the first inductor coil 124 begins heating the susceptor 132, the first region of the susceptor 132 may reach the desired temperature within 2 seconds. However, it may take longer for the heat to penetrate into the aerosol generating material. For example, it may take up to 60 seconds for the aerosol generating material to approach the temperature of the susceptor 132. Due to the efficient nature of inductive heating, the aerosol produced within the first 10-30 seconds may still be suitable for inhalation, despite the aerosol generating material not being fully heated.

Accordingly, the controller 302 may be configured to cause the indicator assembly 306 of the device to indicate that the device is ready for use within a predetermined period of time after causing the first inductor coil to generate the varying magnetic field. For example, the predetermined period of time may be less than about 30 seconds, or less than about 20 seconds, or less than about 15 seconds, or less than about 10 seconds after causing the inductor coil to generate the varying magnetic field. The controller 302 may initiate a timer at the moment it causes the inductor coil to generate the varying magnetic field, which may be at the same moment the controller 302 determines which heating mode has been selected.

In a particular example, the predetermined period of time is dependent upon the mode in which the device is operating. For example, if the device is operating in the second, boost mode, the predetermined period of time is less than the predetermined period of time for when the device is operating in the first, default mode. This may be because the aerosol generating material is heated to a higher temperature in a shorter period of time in the second boost mode, which can mean that the device is ready for use sooner.

In one example, the LEDs 214 emit light to indicate when the device 100 is ready to use. For example, one or all of the LEDs 214 may be illuminated when the device 100 is ready for use (i.e. after the predetermined period of time has elapsed).

In a specific example, the number of LEDs 214 which are illuminated indicates when the device is ready for use. For example, when all of the LEDs 214 are illuminated, the device may be ready for use.

Figure 13A:
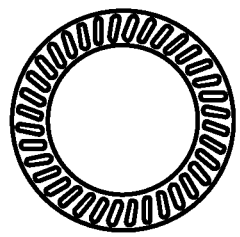
FIGS. 13A-E show the outer member illuminated by a plurality of LEDs.

FIG. 13A depicts the outer member 202 positioned above the four LEDs 214. No light passes through the apertures 204 because none of the LEDs 214 are illuminated. At this moment in time, the user may not yet have pressed the input interface 112, so the controller 302 has not yet received an input selecting a heating mode from the input interface 112, nor has the controller 302 caused the inductor coil 124 to generate the varying magnetic field. When an input has been detected, the controller 302 determines a selected heating mode based on the input, and causes the inductor coil 124 to begin generating the varying magnetic field. The heater assembly 304 therefore begins heating the aerosol generating material according to the selected heating mode. FIG. 13A also shows the outer member 202 at a moment in time after the user has pressed the input interface 112, but before any of the LEDs 214 have been switched on.

Figure 13B:
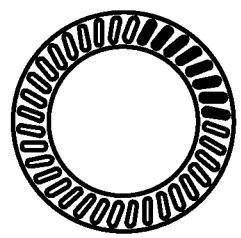

FIG. 13B depicts the outer member 202 a first threshold period of time after the controller 302 caused the inductor coil 124 to generate the varying magnetic field. The first threshold period may be 5 seconds, for example. At this time, one of the LEDs has been illuminated, and light passes through a subset of the apertures 204 to illuminate one quadrant of the outer member 202.

Figure 13C:
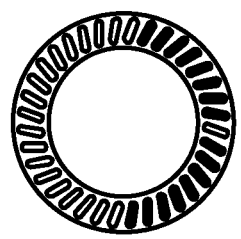

FIG. 13C depicts the outer member 202 a second threshold period of time after the controller 302 caused the inductor coil 124 to generate the varying magnetic field. The second threshold period may be 10 seconds, for example. At this time, two of the LEDs have been illuminated, and light passes through a subset of the apertures 204 to illuminate two quadrants of the outer member 202.

Figure 13D:
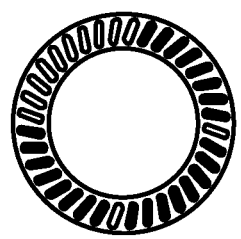

FIG. 13D depicts the outer member 202 a third threshold period of time after the controller 302 caused the inductor coil 124 to generate the varying magnetic field. The third threshold period may be 15 seconds, for example. At this time, three of the LEDs have been illuminated, and light passes through a subset of the apertures 204 to illuminate three quadrants of the outer member 202.

Figure 13E:
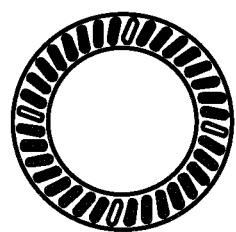

FIG. 13E depicts the outer member 202 a fourth threshold period of time after the controller 302 caused the inductor coil 124 to generate the varying magnetic field. The fourth threshold period may be 20 seconds, for example. At this time, all four of the LEDs have been illuminated, and light passes through the majority of the apertures 204 to illuminate four quadrants of the outer member 202. Accordingly, when all four LEDs are illuminated, the indicator assembly 306 indicates that the device is ready for use. This can occur within 30 seconds of causing the inductor coil 124 to generate the magnetic field. Preferably this occurs within 20 seconds.

In another example, the first threshold period of time may be between about 3 seconds and 5 seconds, the second threshold period of time may be between about 6 seconds and 10 seconds, the third threshold period of time may be between about 9 seconds and 15 seconds and the fourth threshold period of time may be between about 12 seconds and 20 seconds. The first, second, third and fourth threshold periods of time may be dependent upon the mode in which the device is operating. For example, if the device is operating in the first default mode, the first, second, third, and fourth threshold periods may be longer than the respective first, second, third, and fourth threshold periods for when the device is operating in the second, boost mode. This can be because the aerosol generating material heats up quicker in the second, boost mode.

In a particular example, the indicator assembly 306 may further comprise a haptic component, where the haptic component is configured to provide haptic feedback to indicate that the device has begun heating the aerosol generating material. This can be useful if the first LED is not illuminated at the time the inductor coil begins to generate the magnetic field, but is instead illuminated after the first threshold period. The haptic feedback may be indicative of the mode in which the device is operating.

In some examples the first LED may be illuminated at substantially the same time the controller 302 causes the inductor coil 124 to generate the magnetic field (i.e. rather than after a first threshold period of time has elapsed). Accordingly, the visual component of the indicator assembly 306 may also indicate that the device has begun heating the aerosol generating material. A haptic component may also provide a substantially simultaneous indication at the time the inductor coil begins to generate the magnetic field.

In another example, the indicator assembly 306 may comprise a haptic component, where the haptic component is configured to provide haptic feedback to indicate that the device is ready for use. This may occur instead of, or in addition to any other types of indications. For example, the indicator assembly 306 may provide both a visual indication and haptic feedback to indicate that the device is ready for use.

In another example, the indicator assembly 306 may comprise an audible indicator, where the audible indicator is configured to emit sound to indicate that the device is ready for use. This may occur instead of, or in addition to any other types of indications. For example, the indicator assembly 306 may provide both a visual indication and emit sound to indicate that the device is ready for use.

Input Interface

As mentioned above, the controller 302 detects an input from the input interface 112, and responsively determines a selected heating mode and causes the inductor coil 124 to generate the varying magnetic field. In the present example, the input interface 112 comprises a single button and the input interface 112 sends a signal to the controller 302 to indicate that the user has operated the input interface 112. In a specific example, the signal indicates that the user has released the button. A user can therefore press and hold the button, and the controller 302 determines the selected heating mode and causes the inductor coil 124 to generate the varying magnetic field after the button has been released.

In a specific example, the user can press and hold the button for different lengths of time, and the device is operated in a particular mode depending upon the length of time. The input received from the input interface 112 may therefore also comprise a signal indicating the length of time that the button was pressed, and the controller 302 may be configured to cause the inductor coil 124 to generate the varying magnetic field in response to receiving the signal indicating that the button has been released and in response to determining that the length of time that the button has been pressed is greater than or equal to a threshold time period. If the length of time is less than the threshold time period, the device 100 does not begin heating. Based on the length of time, the controller 302 can determine which mode has been selected. In a particular example, if the length of time is less than the threshold time period, the device 100 may display a power level of device's power source 118.

As mentioned, the device 100 may be configured to operate in a first mode or a second mode. Thus, in a particular example, if the length of time that the button has been pressed is greater than or equal to a first threshold time period and is less than a second threshold time period, the controller 302 is configured to operate the device in the first mode. If the length of time that the button has been pressed is greater than or equal to the second threshold time period, the device is configured to operate in the second mode. The first threshold time period may be 3 seconds, and the second threshold time period may be 5 seconds, for example. Thus, using a single button the user can select different modes. If the user holds down the button for longer than 3 seconds, but less than 5 seconds, the device operates in the first mode.

In a particular example, if the length of time that the button has been pressed is greater than or equal to a third threshold time period, the device is configured to operate in a settings mode. A settings mode can allow the user to configure settings of the device. The third threshold time period may be greater than the second threshold time period. In a particular example, the third threshold time period is 8 seconds. If the user holds down the button for longer than 5 seconds, but less than 8 seconds, the device operates in the second mode.

In another example, if the length of time that the button has been pressed is greater than or equal to a fourth threshold time period, but less than first time period, the device is configured to display a power level of the power source 118. The fourth threshold time period may be 1 second, for example. If the user holds down the button for longer than 1 second and less than 3 seconds, the device can display the power level. The power level may be indicated by the indicator assembly 306. For example, if the power level is between 0% and 25%, one of the four LEDs 214 may be illuminated. If the power level is between 25% and 50%, two of the LEDs 214 may be illuminated. If the power level is between 50% and 75%, three of the LEDs 214 may be illuminated. If the power level is between 75% and 100%, four of the LEDs 214 may be illuminated.

The above describes just one specific type of input interface 112. In another example the user selects the operating mode using a touchscreen. In another example, there may be one or more input interfaces. For example, to operate the device in a first mode the user may operate a first input interface and to operate the device in a second mode the user may operate a second input interface. The controller 302 may therefore be configured to cause the inductor coil to generate the varying magnetic field in response to an input received from one of the first and second input interfaces.

Indicating that the Device has Finished Operating

As described above, the indicator assembly 306 can indicate that the device is ready for use, or to indicate that the device has begun heating the aerosol generating material. Alternatively, or additionally, the indicator assembly 306 can indicate that the device has finished operating or is about to finish operating. In certain examples, the indicator assembly 306 is configured to indicate the time left until the device finishes operating.

The device may be configured to heat the aerosol generating material for a predetermined period of time. The controller 302 may therefore cause the indicator assembly 306 to indicate that the device has finished operating or is about to finish operating within a predetermined period of time after causing the inductor coil to generate the varying magnetic field. The predetermined period of time may be about three minutes, three minutes and thirty seconds, or four minutes for example. In some examples the predetermined time depends upon the mode in which the device is operating.

In one example, the indicator assembly 306 indicates that the device has finished operating or is about to finish operating by ceasing to provide any indications. For example, while the device is operating, a visual component, such as one or more LEDs, may visually indicate that the device is operating. When the visual indication stops, the user may be informed that the device has finished operating. For example, if the one or more LEDs are illuminated while the device is operating, they may be switched off when the device has finished operating, thus providing an indication to the user.

In another example, the indicator assembly 306 indicates that the device has finished operating by providing a particular indication. For example, a visual component may provide a particular indication to indicate that the device has finished operating or is about to finish operating. The visual indication may be different to a previous visual indication. For example, if one or more LEDs are illuminated while the device is operating, they may flash in a particular pattern to indicate that the device has finished operating or is about to finish operating.

In a particular example, the indicator assembly 306 may comprise a haptic component, where the haptic component is configured to provide haptic feedback to indicate that the device has finished operating or is about to finish operating. In another example, the indicator assembly 306 may comprise an audible indicator, where the audible indicator is configured to emit sound to indicate that the device has finished operating or is about to finish operating. Two or more different types of indication may be provided.

In some examples, the indicator assembly 306 is configured to indicate the time left until the device finishes operating. For example, an indication may be provided at various points in time as the device approaches its finishing time.

In one example, a haptic component may provide haptic feedback 20 seconds from the end of the heating session, and may also provide haptic feedback 15 seconds from the end of the heating session, 10 seconds from the end of the heating session, 5 seconds from the end of the heating session and at the end of the heating session. The haptic feedback provided at each moment in time may be the same or different. For example, the feedback may become more intense or may last longer towards the end of the heating session.

In another example, the indicator assembly 306 comprises a plurality of LEDs, and the number of illuminated LEDs indicates the time left until the device finishes operating. For example, when the device is operating there may be a first number of LEDs illuminated and when the device has finished operating there may be a second number of LEDs illuminated, where the second number is less than the first number. The second number may be zero, for example. The first number may be all of the LEDs. The LEDs may therefore "count down" as the device gets closer to finishing.

In a particular example there are a plurality of LEDs, such as four LEDs, and the LEDs are sequentially switched off as the end of the heating session approaches. FIG. 13E may depict the outer member 202 as the device is operating. The first and/or second inductor coils may or may not be active at this time. At this time, all four LEDs are illuminated to indicate that the user can still use the device. There may be a threshold period of time remaining until the device finishes operating. For example, there may be 20 seconds remaining until the device finishes operating.

In one example the device is said to have "finished operating" at the time the first and/or second inductor coil has ceased generating the varying magnetic field. In another example, the device is said to have "finished operating" at the time the aerosol temperature/volume is considered to fall below an acceptable level, which may be after the point at which the first and/or second inductor coil has ceased generating the varying magnetic field.

FIG. 13D may depict the outer member 202 at a later time than that shown in FIG. 13E. For example, there may only be 15 seconds remaining until the device finishes operating. At this time, one of the four LEDs has been switched off and light passes through a subset of the apertures 204 to illuminate three quadrants of the outer member 202.

FIG. 13C may depict the outer member 202 at a later time than that shown in FIG. 13D. For example, there may only be 10 seconds remaining until the device finishes operating. At this time, two of the four LEDs have been switched off and light passes through a subset of the apertures 204 to illuminate two quadrants of the outer member 202.

FIG. 13B may depict the outer member 202 at a later time than that shown in FIG. 13C. For example, there may only be 5 seconds remaining until the device finishes operating. At this time, three of the four LEDs have been switched off and light passes through a subset of the apertures 204 to illuminate one quadrant of the outer member 202.

FIG. 13A may depict the outer member 202 at a later time than that shown in FIG. 13B. For example, the device may have finished operating. At this time, all four LEDs have been switched off and no light is visible. The indicator assembly 306 therefore indicates that the device has finished operating, while also indicating the time left until the device has finished operating.

Figure 14:
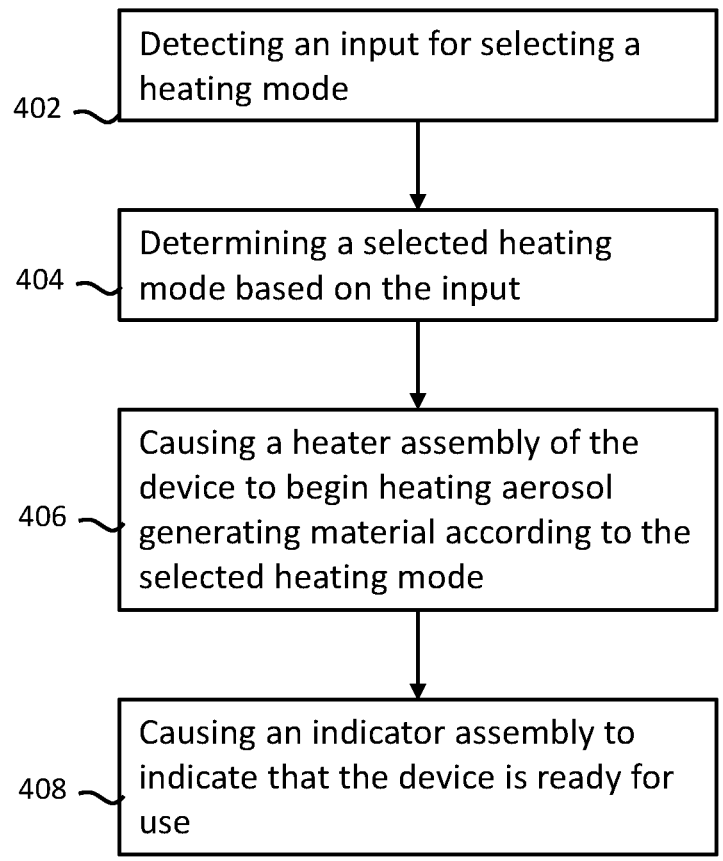
FIG. 14 shows a flow diagram of a method of operating a device.

FIG. 14 is a flow diagram of a method of operating an aerosol provision device. The method comprises, at block 402, detecting an input for selecting a heating mode from a plurality of heating modes comprising a first mode and a second mode. Responsive to detecting the input, the method comprises, at block 404, determining a selected heating mode based on the input. The method comprises, at block 406, causing a heater assembly of the device to begin heating aerosol generating material according to the selected heating mode. The method comprises, at block 408, causing an indicator assembly to indicate that the device is ready for use within a predetermined period of time after causing the heater assembly to begin heating the aerosol generating material.

Figure 15:
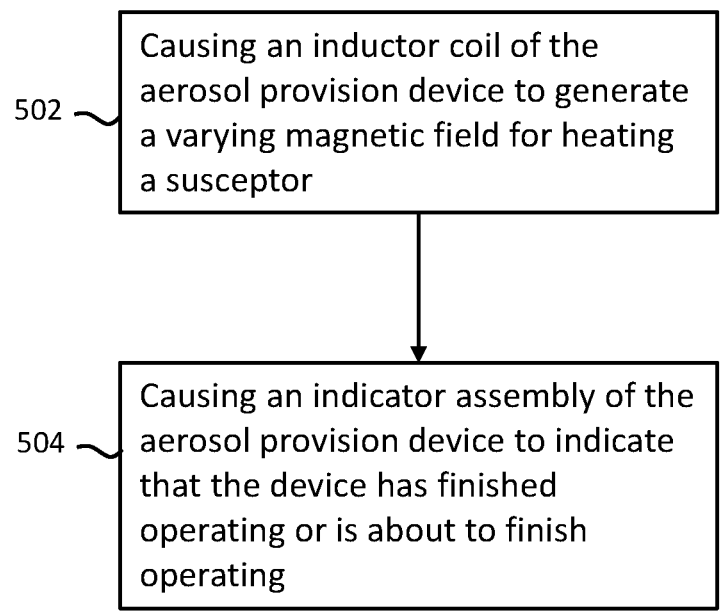
FIG. 15 shows a flow diagram of a method of operating a device.

FIG. 15 is a flow diagram of another method of operating an aerosol provision device. The method comprises, at block 502, causing an inductor coil of the aerosol provision device to generate a varying magnetic field for heating a susceptor. The method comprises, at block 504, causing an indicator assembly of the aerosol provision device to indicate that the device has finished operating or is about to finish operating within a predetermined period of time after causing the inductor coil assembly to begin heating the aerosol generating material.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An aerosol provision device, comprising:
   a heater assembly configured to heat aerosol generating material;
   an indicator assembly;
   an input interface configured to receive an input for selecting a heating mode from a plurality of heating modes comprising a first mode and a second mode; and
   a controller, configured to:
      detect the input for selecting the heating mode; and
      responsive to detecting the input:
      determine a selected heating mode based on the input;
      cause the heater assembly to begin heating the aerosol generating material according to the selected heating mode; and
      control the indicator assembly to indicate when the device is in a ready for use state in which a desired volume of aerosol for a first puff to be inhaled has been generated from the aerosol generating material, said control occurring within a predetermined period of time after causing the heater assembly to begin heating the aerosol generating material.

2. The aerosol provision device according to claim 1, wherein the predetermined period of time is less than about 30 seconds after causing the heater assembly to begin heating.

3. The aerosol provision device according to claim 2, wherein the predetermined period of time is less than about 20 seconds after causing the heater assembly to begin heating.

4. The aerosol provision device according to claim 1, wherein the predetermined period of time is dependent upon the selected heating mode.

5. The aerosol provision device according to claim 4, wherein in the second mode the controller is configured to cause the heater assembly to heat a heating component of the heater assembly to a higher temperature than in the first mode; and
   wherein the predetermined period of time is less than the predetermined period of time for when the device is operating in the first mode.

6. The aerosol provision device according to claim 1, wherein the input interface comprises a button, and the input comprises a signal indicating that the button has been released.

7. The aerosol provision device according to claim 6, wherein the input further comprises a signal indicating a length of time that the button has been pressed, and the controller is configured to detect the input for selecting a heating mode in response to:
   receiving the signal indicating that the button has been released; and
   determining that the length of time that the button has been pressed is equal to or greater than a predetermined threshold time period.

8. The aerosol provision device according to claim 7, wherein the controller is configured to determine a selected heating mode based on the length of time the button was pressed.

9. The aerosol provision device according to claim 1, wherein the indicator assembly comprises a visual component to indicate that the device is ready for use.

10. The aerosol provision device according to claim 1, wherein the indicator assembly comprises a haptic component configured to provide haptic feedback to indicate that the device is ready for use.

11. The aerosol provision device according to claim 1, wherein the indicator assembly comprises an audible component configured to emit sound to indicate that the device is ready for use.

12. The aerosol provision device according to claim 1, wherein the controller is configured to cause the indicator assembly to indicate that the device has finished operating or is about to finish operating within a second predetermined period of time after causing the heater assembly to begin heating the aerosol generating material.

13. The aerosol provision device according to claim 1, wherein the heater assembly comprises:
   an inductor coil for generating a varying magnetic field; and
   a susceptor arranged to heat the aerosol generating material, wherein the susceptor is heatable by penetration with the varying magnetic field; and
   further wherein the controller is configured to cause the heater assembly to begin heating the aerosol generating material according to the selected heating mode by causing the inductor coil to generate the varying magnetic field.

14. The aerosol provision device according to claim 13, wherein the inductor coil is a first inductor coil, and the heater assembly further comprises a second inductor coil for generating a second varying magnetic field, and wherein:
   the first inductor coil is adjacent the second inductor coil in a direction along the longitudinal axis;
   the controller is configured to cause the second inductor coil to generate the second varying magnetic field after causing the indicator assembly to indicate that the device is ready for use; and
   in use, the aerosol is drawn along a flow path of the device towards a proximal end of the device, and the first inductor coil is arranged closer to the proximal end of the device than the second inductor coil.

15. The aerosol provision device according to claim 1, wherein the heating assembly comprises a first inductor coil for generating a first varying magnetic field, and a second inductor coil for generating a second varying magnetic field; and
   wherein the controller is configured to:
      cause the heater assembly to begin heating the aerosol generating material according to the selected heating mode by causing the first inductor coil to generate the first varying magnetic field; and cause the second inductor coil to generate the second varying magnetic field after causing the indicator assembly to indicate that the device is ready for use.

16. A method of operating an aerosol provision device, comprising:
  detecting an input for selecting a heating mode from a plurality of heating modes comprising a first mode and a second mode;
  responsive to detecting the input:
    determining a selected heating mode based on the input;
    causing a heater assembly of the device to begin heating aerosol generating material according to the selected heating mode; and
    controlling an indicator assembly to indicate when the device is in a ready for use state in which a desired volume of aerosol for a first puff to be inhaled has been generated from the aerosol generating material, said control occurring within a predetermined period of time after causing the heater assembly to begin heating the aerosol generating material.

17. The method according to claim 16, wherein the predetermined period of time is less than about 30 seconds after causing the heater assembly to begin heating.

18. The method according to claim 17, wherein the predetermined period of time is less than about 20 seconds after causing the heater assembly to begin heating.

19. The method according to claim 16, wherein the predetermined period of time is dependent upon the selected heating mode.

20. The method according to claim 19, wherein in the second mode the method comprises causing the heater assembly to heat a heating component of the heater assembly to a higher temperature than in the first mode; and
  the predetermined period of time is less than the predetermined period of time for when the device is operating in the first mode.

21. The method according to claim 16, wherein detecting an input for selecting a heating mode comprises detecting that a button has been released.

22. The method according to claim 21, wherein detecting an input for selecting a heating mode further comprises detecting a length of time that the button has been pressed, and the selected heating mode is determined based on the length of time that the button has been pressed.

23. The method according to claim 16, further comprising causing the indicator assembly to indicate that the device has finished operating or is about to finish operating within a predetermined period of time after causing the heater assembly to begin heating the aerosol generating material.

24. The method according to claim 16, wherein said causing the heater assembly to begin heating the aerosol generating material according to the selected heating mode comprises causing a first inductor coil of the heater assembly to generate a first varying magnetic field; and
  further comprising causing a second inductor coil of the heater assembly to generate a second varying magnetic field after causing the indicator assembly to indicate that the device is ready for use.

25. An aerosol provision device comprising:
  a heater assembly configured to heat aerosol generating material;
  an indicator assembly;
  an input interface configured to receive an input for selecting a heating mode from a plurality of heating modes comprising a first mode and a second mode; and
  a controller configured to:
    detect the input for selecting the heating mode, and responsive to detecting the input
    determine a selected heating mode based on the input;
    cause the heater assembly to begin heating the aerosol generating material according to the selected heating mode; and
    control the indicator assembly to indicate when the device is in a ready for use state, within a predetermined period time after causing the heater assembly to begin heating the aerosol generating material, wherein the predetermined period of time includes a period of time after the susceptor has reached a desired temperature for the selected heating mode.

26. The aerosol provision device according to claim 25, comprising a first inductor coil for generating a first varying magnetic field, and a second inductor coil for generating a second varying magnetic field; and
  wherein the controller is configured to:
    cause the heater assembly to begin heating the aerosol generating material according to the selected heating mode by causing the first inductor coil to generate the first varying magnetic field; and
    cause the second inductor coil to generate the second varying magnetic field after causing the indicator assembly to indicate that the device is ready for use.

\* \* \* \* \*